United States Patent
Shimbaru

(10) Patent No.: US 8,818,084 B2
(45) Date of Patent: Aug. 26, 2014

(54) COLOR PROCESSING APPARATUS AND METHOD THEREOF

(75) Inventor: Susumu Shimbaru, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 205 days.

(21) Appl. No.: 13/453,823

(22) Filed: Apr. 23, 2012

(65) Prior Publication Data
US 2012/0287293 A1  Nov. 15, 2012

(30) Foreign Application Priority Data
May 10, 2011  (JP) ................. 2011-105657

(51) Int. Cl.
*G06K 9/00* (2006.01)
*H04N 5/225* (2006.01)

(52) U.S. Cl.
USPC ...................... 382/162; 348/207.2

(58) Field of Classification Search
CPC ............................ H04N 1/6086; G06T 11/001
USPC .............. 382/162, 167, 305, 312; 348/207.2; 345/589, 600, 601
See application file for complete search history.

(56) References Cited

U.S. PATENT DOCUMENTS

| | | | |
|---|---|---|---|
| 6,885,382 B1 * | 4/2005 | Matsuzaki et al. | 345/600 |
| 7,019,789 B2 * | 3/2006 | Kang et al. | 348/655 |
| 7,158,144 B2 * | 1/2007 | Shiraiwa et al. | 345/589 |
| 8,031,939 B2 | 10/2011 | Suzuki et al. | 382/167 |

FOREIGN PATENT DOCUMENTS

JP  2008-271303  11/2008

OTHER PUBLICATIONS

U.S. Appl. No. 13/480,389, filed May 24, 2012 by Takahiro Suzuki et al.

* cited by examiner

*Primary Examiner* — Kanjibhai Patel
(74) *Attorney, Agent, or Firm* — Fitzpatrick, Cella, Harper & Scinto

(57) ABSTRACT

A table, which records a relationship between image data of patches included in a chart, which are acquired by capturing the chart under a plurality of types of illumination light having different characteristics, and the characteristics, is held for each image capturing device capturing the chart, and for each chart print condition. Specifying information of an image capturing device used to estimate characteristics of illumination light and a print condition of a chart used to estimate the characteristics of the illumination light are input as estimation conditions. Image data of a chart captured by the image capturing device under the illumination light is input. The characteristics of the illumination light are estimated based on a table corresponding to the estimation conditions and the input image data.

10 Claims, 20 Drawing Sheets

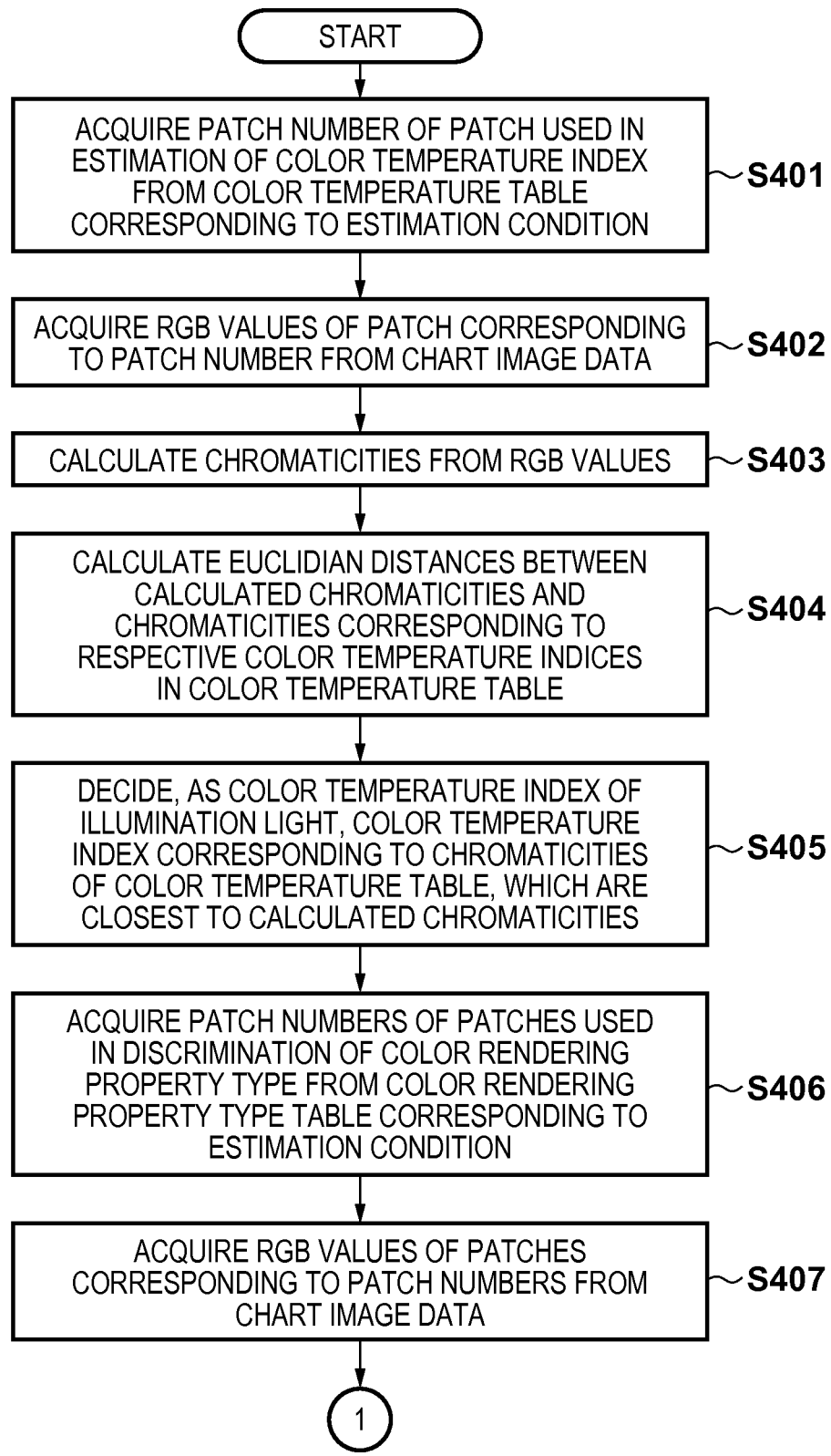

FIG. 5

| PATCH NUMBER | COLOR TEMPERATURE INDEX | CHROMATICITIES | |
|---|---|---|---|
| | | r | g |
| N | INCANDESCENT | 0.48 | 0.32 |
| | WARM WHITE | 0.43 | 0.335 |
| | WHITE | 0.39 | 0.345 |
| | NEUTRAL WHITE | 0.34 | 0.34 |
| | DAYLIGHT | 0.28 | 0.334 |

FIG. 6

| COLOR TEMPERATURE INDEX | PATCH NUMBER | COLOR RENDERING PROPERTY TYPE | | RGB VALUES CORRESPONDING TO COLOR RENDERING PROPERTY TYPE | |
|---|---|---|---|---|---|
| | | A | B | A | B |
| INCANDESCENT | 341 | BROAD BAND | THREE BAND | (150, 10, 223) | ... |
| | 412 | BROAD BAND | NORMAL | (188, 5, 201) | ... |
| | 155 | THREE BAND | NORMAL | (45, 241, 41) | ... |
| ... | ... | ... | ... | ... | ... |
| NEUTRAL WHITE | 249 | BROAD BAND | THREE BAND | (101, 8, 161) | (91, 8, 166) |
| | 340 | BROAD BAND | NORMAL | (133, 47, 204) | (115, 46, 214) |
| | 155 | THREE BAND | NORMAL | (38, 240, 41) | ... |
| DAYLIGHT | 333 | BROAD BAND | THREE BAND | (140, 17, 212) | ... |
| | 495 | BROAD BAND | NORMAL | (195, 14, 210) | ... |
| | 75 | THREE BAND | NORMAL | (11, 240, 68) | ... |

F I G. 9
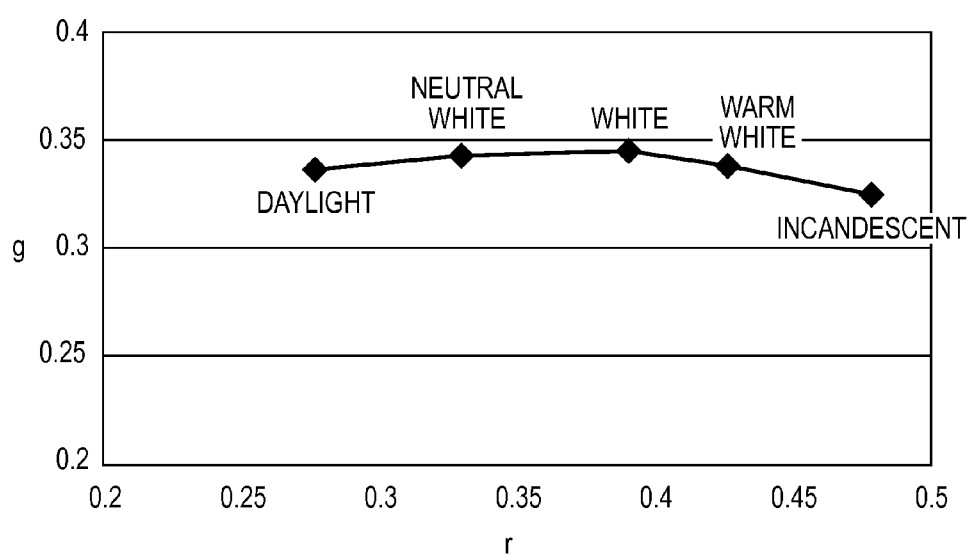

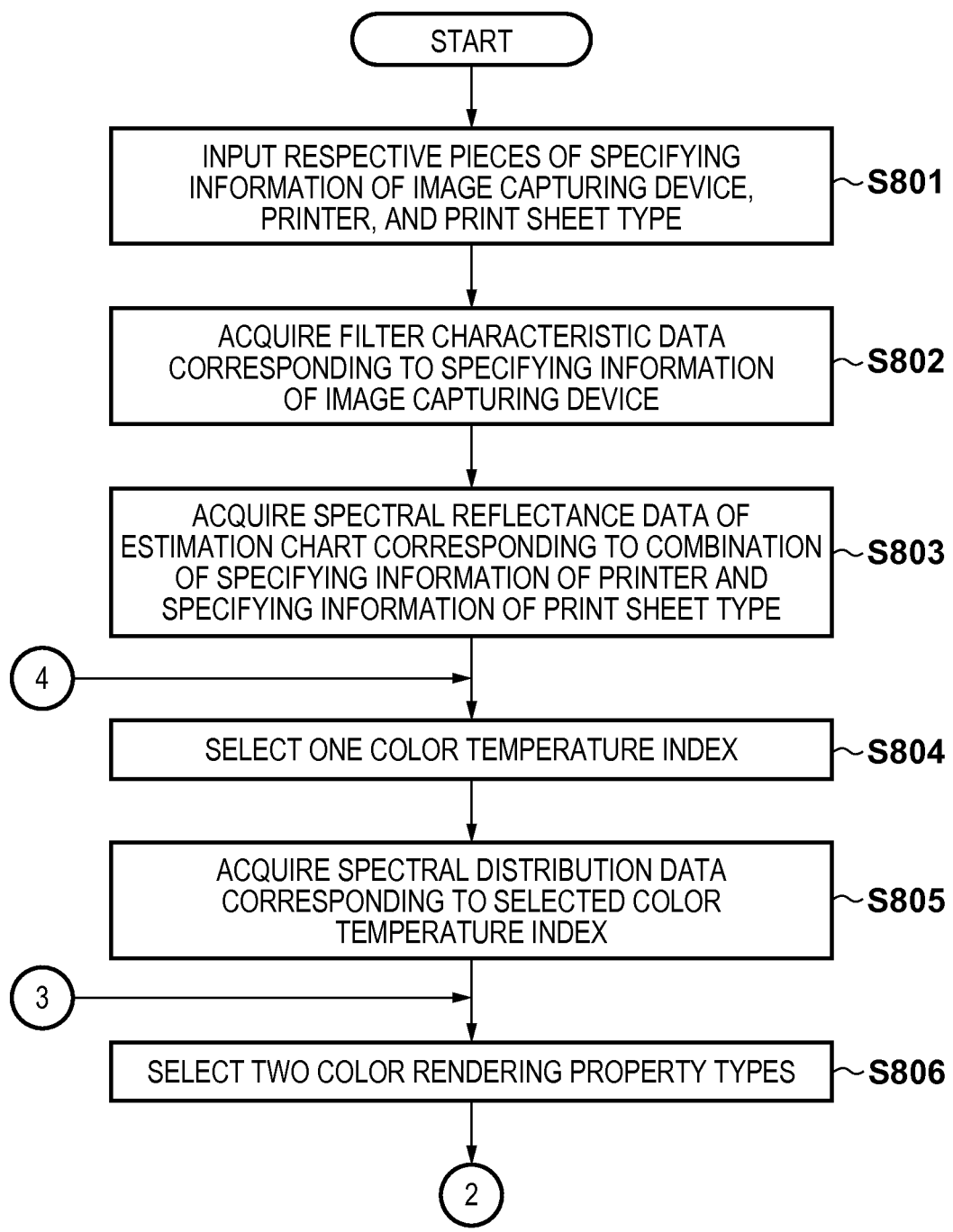

F I G. 11
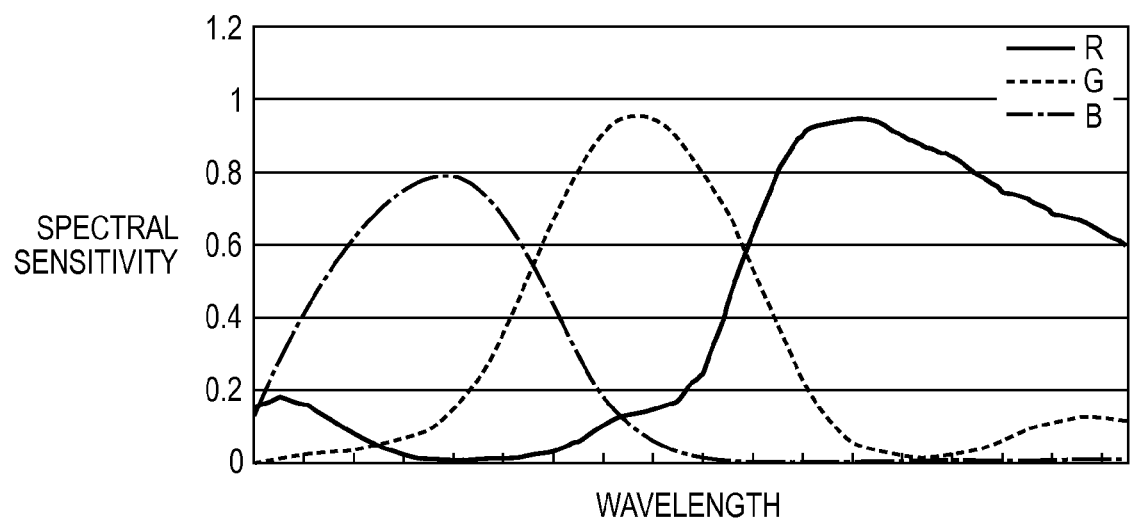
F I G. 12
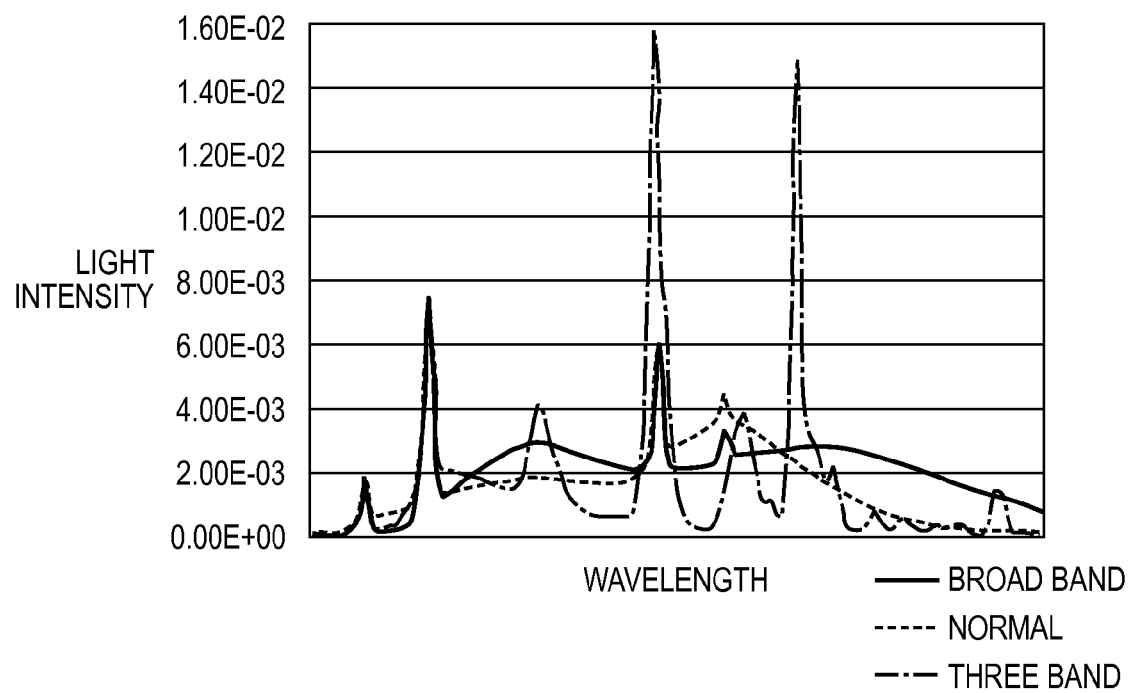

COLOR PROCESSING APPARATUS AND METHOD THEREOF

BACKGROUND OF THE INVENTION

1. Field of the Invention

The present invention relates to color processing for estimating characteristics of illumination light.

2. Description of the Related Art

It becomes a common practice to input images from an image input device such as a digital camera or scanner to a personal computer (PC), to display the images on a display device such as a liquid crystal display (LCD), and to output the images using an output device such as a printer. Then, a color management technique which absorbs color reproduction differences between various devices and corrects colors for any purpose becomes important. That is, image data undergoes color conversion by the color management technique to attain color matching between, for example, an image to be displayed on a monitor and that to be output by a printer.

However, color appearance largely varies depending on viewing illuminations of images. Even when color matching is attained under a certain condition, color matching is disabled if a viewing illumination has changed. For example, fluorescent lamps, which are generally used in offices and home, are classified based on their color temperatures and color rendering property types, and color appearance changes depending on their types.

The color temperatures of the fluorescent lamps are classified into five indices, that is, "incandescent", "warm white", "white", "neutral white", and "daylight". Also, the color rendering property types of the fluorescent lamps are classified into three types, that is, "broad band", "three band", and "normal". The color temperatures have warm colors as they are lower, and have cool colors as they are higher. The index "incandescent" has a warmest color, and the indices "warm white", "white", "neutral white", and "daylight" have colors closer to cool colors in the order named.

The color rendering property is an index indicating how much a color of an object illuminated with illumination light is closer to that when the object is illuminated with sunny daylight outdoors. That is, as the color rendering property is higher, a color under sunny daylight outdoors is reproduced more faithfully. A fluorescent lamp of a "broad band" type has the highest color rendering property, and is used in business places associated with colors, art museums, and the like. A fluorescent lamp of a "three band" type has the second highest color rendering property, and is popularly used in home, offices, and the like. A fluorescent lamp of a "normal" type has the lowest color rendering property, and is used in general offices, warehouses, and the like in which the color appearance does not mean much.

In this manner, when only fluorescent lamps are covered, there are many types of fluorescent lamps, and accurate color matching cannot be expected unless the characteristics of viewing illuminations are taken into consideration. For example, when an image, which matches a monitor color under a bluish white illumination such as a "daylight" fluorescent lamp, is output, if that image is viewed under a reddish illumination such as a "incandescent" fluorescent lamp, the entire image is reddish in color, and does not match a color of the image displayed on the monitor.

In order to solve such problem, characteristics of viewing illuminations have to be acquired, and color matching processing suited to the acquired characteristics has to be executed. Japanese Patent Laid-Open No. 2008-271303 (literature 1) describes an invention which executes color matching processing suited to viewing illuminations. According to literature 1, a chart on which a plurality of images, obtained by color-correcting a plurality of memory colors in correspondence with a plurality of light sources, are laid out is output. Then, the control prompts the user to select a most preferred image of the chart under a viewing illumination. That is, the color temperature index and color rendering property type of the viewing illumination are determined based on the image which is visually selected by the user.

However, determination of the color temperature index and color rendering property type of the viewing illumination in literature 1 depends on a visual organoleptic examination of the user, and an accurate determination result cannot always be obtained. Of course, when the viewing illumination is measured, an accurate determination result can be obtained. However, expensive measuring devices are required, and expert knowledge is also required to operate the measuring devices.

SUMMARY OF THE INVENTION

In one aspect, a color processing method comprising: storing in a memory, for each image capturing device capturing a chart, a table which records a relationship between image data of patches included in the chart, which are acquired by capturing the chart under a plurality of types of illumination light having different characteristics, and the characteristics; inputting, as estimation conditions, specifying information of an image capturing device used to estimate characteristics of illumination light, and a print condition of a chart used to estimate the characteristics of the illumination light; inputting image data of the chart, which is captured by the image capturing device under the illumination light; and estimating the characteristics of the illumination light from the table corresponding to the estimation conditions and the input image data.

According to the aspect, the characteristics of illumination light can be easily and accurately estimated.

Further features of the present invention will become apparent from the following description of exemplary embodiments with reference to the attached drawings.

BRIEF DESCRIPTION OF THE DRAWINGS

FIGS. 4A and 4B are flowcharts for explaining the estimation processing of the illumination characteristics.

FIG. 5 shows an example of a color temperature table corresponding to certain estimation conditions.

FIG. 6 shows an example of a color rendering property type table corresponding to certain estimation conditions.

FIG. 9 is a graph showing the correlation relationship between the color temperatures of illumination light and RGB values of a patch image obtained by capturing a white patch.

FIGS. 10A and 10B are flowcharts for explaining selection processing of patches used in discrimination of a color rendering property type.

FIG. 11 is a graph showing an example of filter characteristic data.

FIG. 12 is a graph showing an example of spectral distribution data.

DESCRIPTION OF THE EMBODIMENTS

Color processing according to embodiments of the present invention will be described in detail hereinafter with reference to the drawings.

First Embodiment

Arrangement of Apparatus

Figure 1:
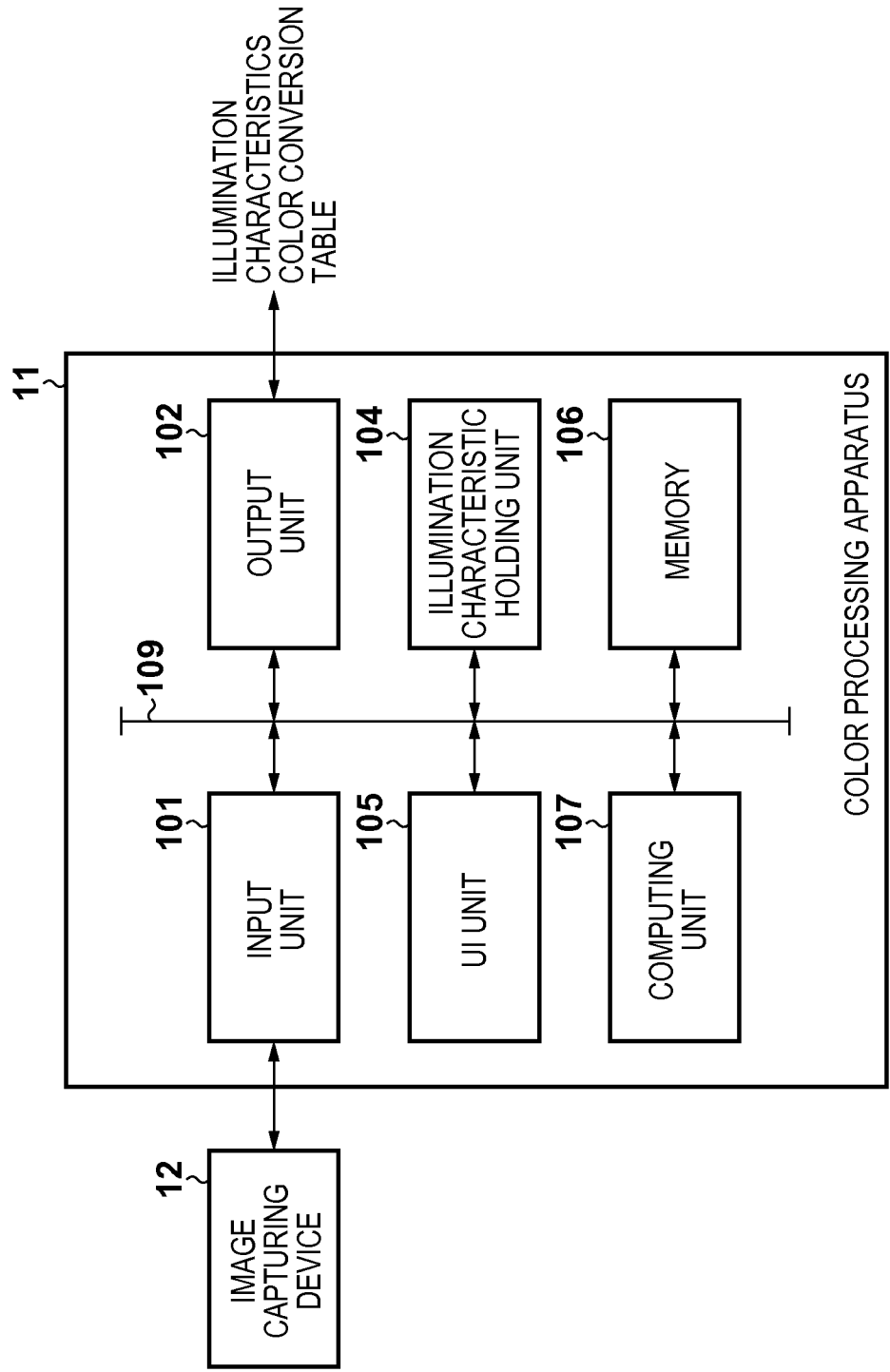
FIG. 1 is a block diagram for explaining the arrangement of a color processing apparatus according to the first embodiment.

The arrangement of a color processing apparatus 11 according to the first embodiment will be described below with reference to the block diagram shown in FIG. 1.

The color processing apparatus 11 receives image data associated with illumination light from an image capturing device 12 (for example, a digital camera), estimates the characteristics of the illumination light (to be referred to as illumination characteristics hereinafter), and generates a color conversion table based on the estimated illumination characteristics.

An input unit 101 includes a serial bus interface (I/F) (for example, USB (Universal Serial Bus) or IEEE1394), and controls the image capturing device 12 to receive image data (to be referred to as chart image data hereinafter) obtained by capturing a predetermined chart (to be referred to as an estimation chart hereinafter).

A computing unit 107 estimates the illumination characteristics from the chart image data, and generates a color conversion table based on the estimated illumination characteristics. An output unit 102 includes a serial bus I/F and network I/F, and outputs the estimation result of the illumination characteristics and the generated color conversion table to an external device (for example, a PC or server). A user interface (UI) unit 105 includes a display device (for example, an LCD), and provides a UI.

An illumination characteristic holding unit 104 is a database which holds a correspondence relationship between chromaticities of patch images and the illumination characteristics. A memory 106 holds information such as device RGB values and spectral reflectance characteristics of the estimation chart, filter characteristics of the image capturing device, and a spectral distribution of illumination light. Also, the memory 106 is used as a work memory which temporarily stores intermediate computing data during processes to be described later.

Note that the illumination characteristic holding unit 104 and memory 106 are configured by storage devices such as a ROM (Read Only Memory), RAM (Random Access Memory), HDD (Hard Disk Drive), and SSD (Solid-State Drive). Also, the aforementioned units are connected to each other via a system bus 109.

[Estimation Chart]

The estimation chart need not be a chart which is generated while being specialized to estimation of the illumination characteristics in consideration of metamerism. For example, a chart which is used to measure printer characteristics, and on which patches corresponding to RGB values of 729 colors, obtained by equally slicing RGB values into nine within a range from 0 to 255, are printed, is used as the estimation chart. Of course, the number of colors of patches may be larger or smaller than 729 as long as the illumination characteristics can be estimated with the desired precision.

The estimation chart having, for example, patches of 729 colors, is printed using each combination of a printer and a print sheet, which are available for the user, and spectral reflectances of the respective patches are measured. The relationship between the device RGB values of the respective patches and the measurement values of the spectral reflectances are stored in the memory 106 in association with the printer and print sheet (to be referred to as print conditions hereinafter) used in printing. Note that generation of the estimation chart is not limited to the printer as long as a device, print sheet, and device RGB values used to generate the estimation chart can be specified.

[Generation Preparation of Color Conversion Table]

When the illumination characteristics are estimated, and a color conversion table which matches illumination light is generated, the user prints an estimation chart, places that estimation chart under a light source of illumination light, and then places the image capturing device 12 so as to be able to capture an image of the overall estimation chart.

Upon capturing an image of the estimation chart, the layout of the light source of the illumination light, estimation chart, image capturing device 12, and the like is set, so as to prevent the estimation chart from being covered by shadow cast by the color processing apparatus 11, image capturing device 12, user, and the like, and not to capture specular reflection light of the estimation chart. Also, a white balance mode of the image capturing device 12 is set to be "sunny daylight outdoors".

After the aforementioned preparation, the user operates the UI unit 105 to instruct to start processing.

[Estimation of Illumination Characteristics and Generation of Color Conversion Table]

Figure 2:
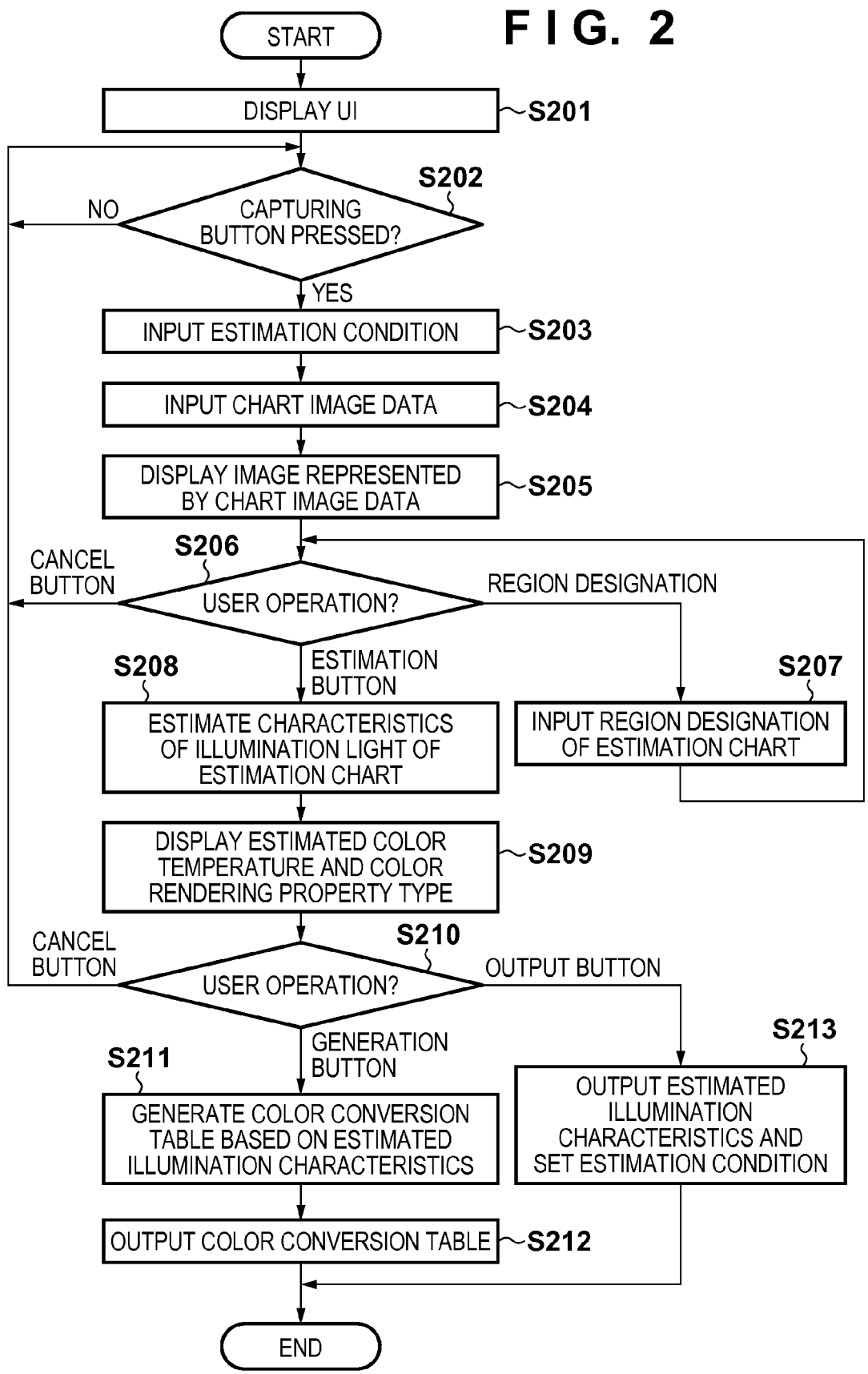
FIG. 2 is a flowchart for explaining estimation processing of illumination characteristics and generation processing of a color conversion table.

The estimation processing of the illumination characteristics and the generation processing of a color conversion table will be described below with reference to the flowchart shown in FIG. 2.

Figure 3:
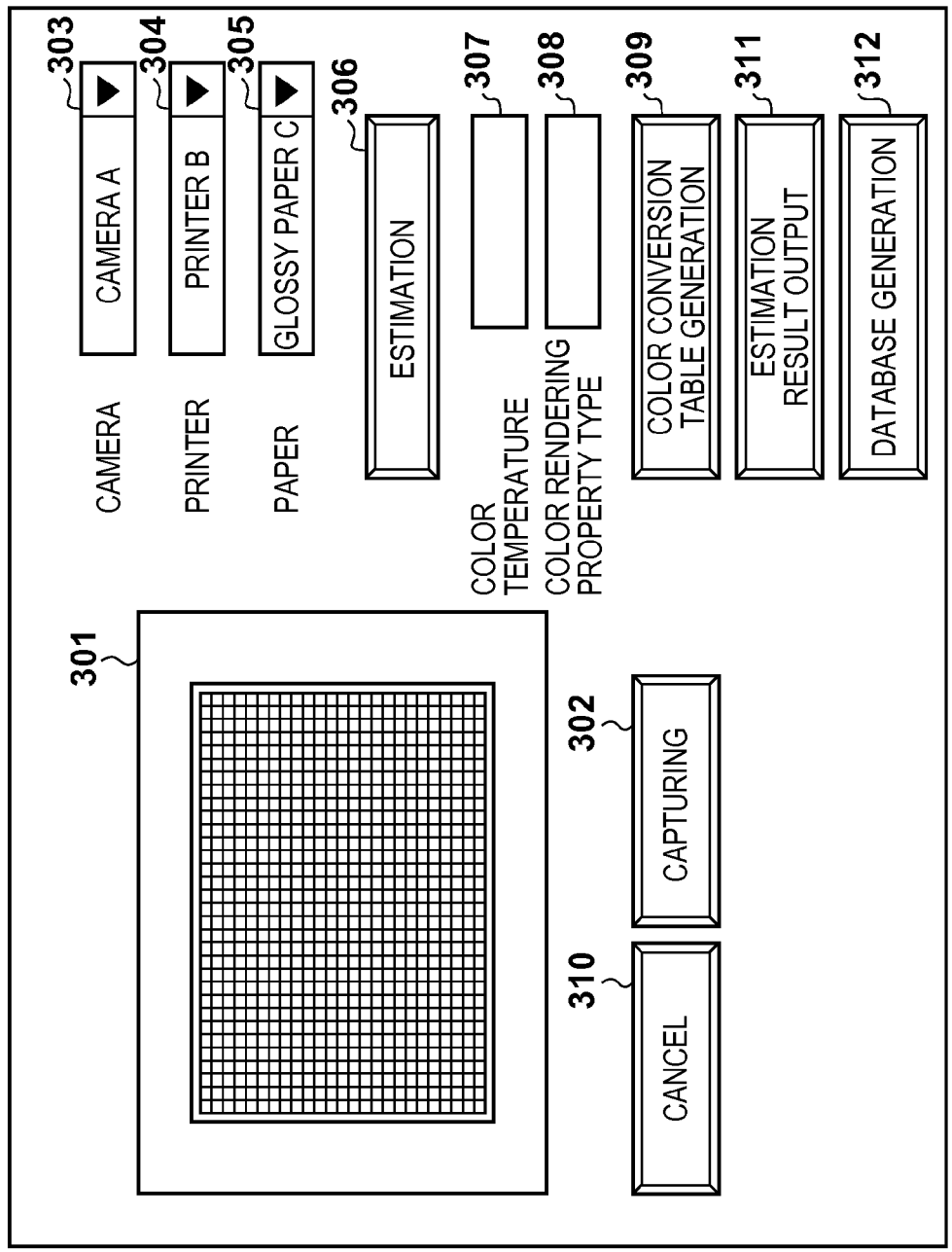
FIG. 3 is a view showing an example of a UI displayed by a UI unit.

When the processing start instruction is input, the UI unit 105 displays a UI (S201). FIG. 3 shows an example of the UI displayed by the UI unit 105. The user operates drop-down combo boxes 303 to 305 shown in FIG. 3 to set a name or model number of the image capturing device 12, and that of a printer and a type (for example, plain paper, glossy paper, mat paper, or the like) or model number of a print sheet, which are used to print the estimation chart. Note that specifying information of the image capturing device 12, that of the printer, and that of the print sheet, which are set by the user, will be referred to as "estimation conditions" in combination hereinafter.

After the estimation conditions are set, the user presses a capturing button 302 to instruct to capture an image of the estimation chart. Upon pressing of the capturing button 302 (S202), the computing unit 107 receives the set estimation conditions (S203), and the input unit 101 controls the image capturing device 12 to receive chart image data and to store the chart image data in a predetermined area on the memory 106 (S204).

Next, the UI unit 105 displays an image represented by the chart image data on a display window 301 (S205). The user refers to the image displayed on the display window 301, and if he or she finds any problems (for example, a portion of the estimation chart is not captured, the estimation chart is shaded, it is unevenly irradiated with the illumination light, specular reflection light enters the image capturing device 12, and so forth), he or she presses a cancel button 310. If no problem is found, the user designates a region of the estimation chart in the image by, for example, touching four corners of the estimation chart in the display image, and then presses an estimation button 306.

If the user presses the cancel button 310 (S206), the process returns to step S202. If, for example, the user touches the region inside the display window 301 (S206), the computing unit 107 receives the touched positions as region designation information of the estimation chart (S207). Then, if the user presses the estimation button 306 (S206), the computing unit 107 estimates the characteristics of the illumination light of the estimation chart (S208), as will be described in detail later.

Next, the UI unit 105 displays the estimated color temperature index and color rendering property type in a color temperature display field 307 and color rendering property type display field 308 (S209). After the color temperature index and color rendering property type are displayed, the user normally presses an estimation result output button 311 or color conversion table generation button 309. However, if the displayed color temperature index and color rendering property type are different from expected ones, the user can press the cancel button 310 to return the process to step S202.

If the user presses the color conversion table generation button 309 (S210), the computing unit 107 generates a color conversion table corresponding to the estimated illumination characteristics, and the printer and print sheet type, which are set by the user (S211), as will be described in detail later. Subsequently, the output unit 102 outputs the generated color conversion table to an output destination designated by the user (S212), thus ending the processing. Note that a header of the color conversion table records the estimated illumination characteristics and the set estimation conditions.

If the user presses the estimation result output button 311 (S210), the output unit 102 outputs data indicating the estimated illumination characteristics and the set estimation conditions to an output destination designated by the user (S213), thus ending the processing.

Estimation of Illumination Characteristics

Figure 4B:
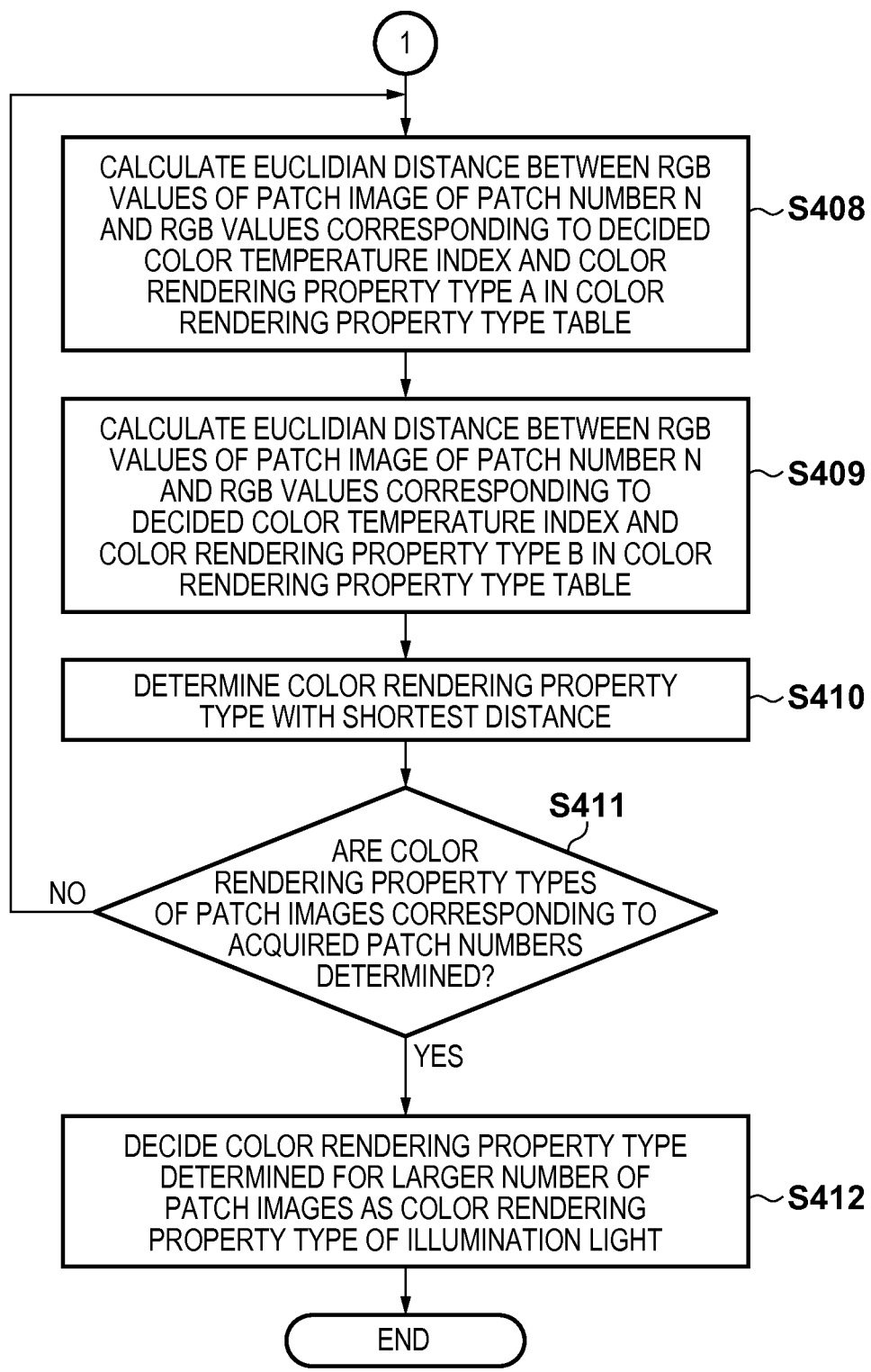

The estimation processing (S208) of the illumination characteristics will be described below with reference to the flowcharts shown in FIGS. 4A and 4B.

The computing unit 107 acquires a patch number of a patch used in estimation of the color temperature index from a color temperature table which is held by the illumination characteristic holding unit 104 and corresponds to the estimation conditions (S401). Then, the computing unit 107 acquires RGB values of a patch image corresponding to the patch number from the chart image data (S402). Note that the RGB values of the patch image are obtained by acquiring RGB values of several to several ten points from the central portion (or a central region having a ¼ area) of the patch image, and calculating an average value of these RGB values (the same applies to the following description).

FIG. 5 shows an example of the color temperature table corresponding to certain estimation conditions. As shown in FIG. 5, the color temperature table describes a correspondence relationship among a patch number, color temperature indices, and chromaticities of the patch image. Note that the generation method of the color temperature table will be described in detail later. Also, the relationship between the chromaticities and RGB values is as follows. Alternatively, the color temperature table may record image data (RGB values) of the patch image, and chromaticities may be calculated as needed by:

$$r = R/(R+G+B)$$

$$g = G/(R+G+B) \quad (1)$$

The computing unit 107 calculates chromaticities r and g from the acquired RGB values (S403), and calculates Euclidean distances between the calculated chromaticities r and g and those corresponding to respective color temperature indices of the color temperature table (S404). Then, the computing unit 107 decides the color temperature index corresponding to the chromaticities of the color temperature table, which are closest to the calculated chromaticities, as that of the illumination light (S405).

Next, the computing unit 107 acquires patch numbers of patches used in discrimination of a color rendering property type from a color rendering property type table, which is held by the illumination characteristic holding unit 104 and corresponds to the estimation conditions (S406). Then, the computing unit 107 acquires RGB values of the patches corresponding to the acquired patch numbers from the chart image data (S407).

FIG. 6 shows an example of the color rendering property type table corresponding to certain estimation conditions. As shown in FIG. 6, the color rendering property type table describes a correspondence relationship among color temperature indices, patch numbers of patches used in discrimination, color rendering property types, and image data (RGB values) of patch images corresponding to the color rendering property types. Note that as typical illumination light, combinations of five types of color temperature indices and three types of color rendering property types (a total of 15 types) will be exemplified, but the present invention is not limited to 15 types.

A case will be explained below wherein "neutral white" is determined as the color temperature index. In the example shown in FIG. 6, patch numbers "249", "340", and "155" of patches to be used in discrimination of a color rendering property type corresponding to "neutral white" are acquired.

Next, the computing unit 107 calculates an Euclidean distance between the RGB values of a patch image of, for example, the patch number "249" and those corresponding to "neutral white" and color rendering property type A ("broad band" type) in the color rendering property type table (S408). Furthermore, the computing unit 107 calculates an Euclidean distance between the RGB values of a patch image of the patch number "249" and those corresponding to "neutral white" and color rendering property type B ("three band" type) in the color rendering property type table (S409). Then, the computing unit 107 determines a color rendering property type corresponding to shorter distances (S410).

Next, the computing unit 107 repeats determination (the same processes as those in steps S408 to S410) of a color rendering property type for the RGB values of the patch images corresponding to the acquired patch numbers in the determination process in step S411, thereby determining color rendering property types for the respective patch images. That is, the computing unit 107 executes determination of a "broad band" type (color rendering property type A) and "normal" type (color rendering property type B) for a patch image of the patch number "340", and executes determination of a "three band" type (color rendering property type A) and "normal" type (color rendering property type B) for a patch image of the patch number "155". Then, the computing unit 107 decides a color rendering property type determined for a larger number of patch images as that of the illumination light (S412). That is, the computing unit 107 decides a color rendering property type determined for two or more patch images as that of the illumination light.

Note that when the computing unit 107 determines different color rendering property types respectively for the three patch images, it displays a message indicating a determination error on the UI unit 105. When the determination error is presented, the user takes certain measures (for example, he or she re-captures an image of the estimation chart, corrects the estimation conditions, or exchanges the estimation chart). Furthermore, when the computing unit 107 determines the same color rendering property type for the three patch images, it may display a message indicating "high estimation precision" on the UI unit 105. On the other hand, when the computing unit 107 determines the same color rendering property type for the two patch images, it may display a message indicating "low estimation precision" on the UI unit 105.

Generation of Color Conversion Table

Figure 7:
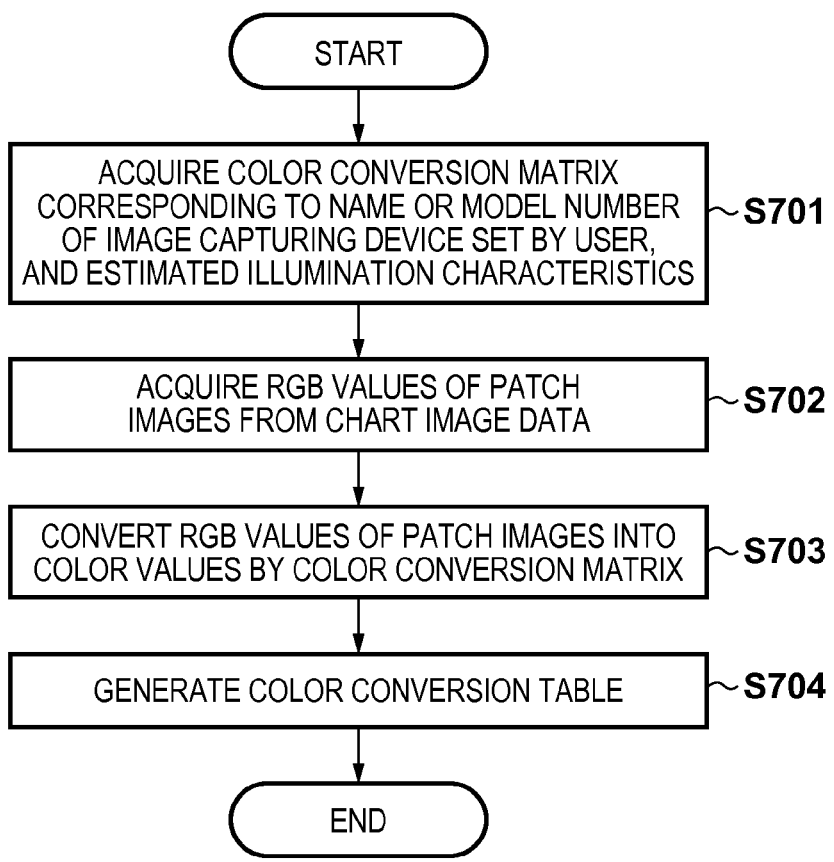
FIG. 7 is a flowchart for explaining the generation processing of the color conversion table.

The color conversion table generation processing (S211) will be described below with reference to the flowchart shown in FIG. 7.

The computing unit 107 acquires a color conversion matrix corresponding to the name or model number of the image capturing device 12 set by the user, and the estimated illumination characteristics from the memory 106 (S701). The color conversion matrix is used to convert RGB values (device RGB values, sRGB values, AdobeRGB values, or the like) output from the image capturing device into color values (for example, CIEXYZ values, CIELab values, or the like). The color conversion matrix is generated in advance for each image capturing device and for each color temperature and each color rendering property type of illumination light, and is stored in the memory 106.

The computing unit 107 acquires RGB values of respective patch images from the chart image data (S702), and converts the RGB values of the respective patch images into color values using the color conversion matrix (S703). Then, the computing unit 107 associates the device RGB values of the respective patches with the color values of the respective patch images, thereby generating a color conversion table from the color values into the device RGB values, which table matches the illumination light, printer, and print sheet (S704).

Use of Color Conversion Table

Figure 8:
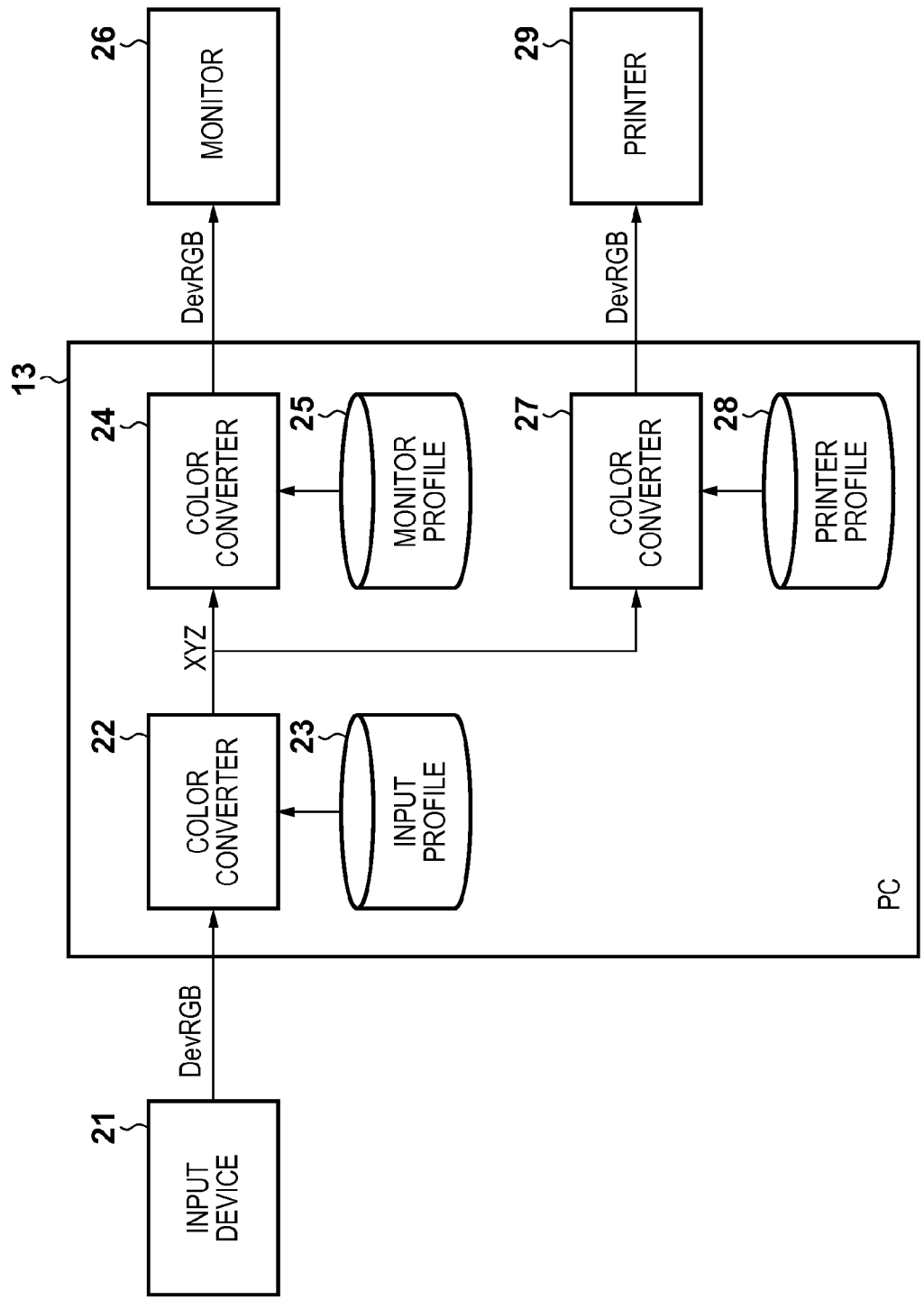
FIG. 8 is a block diagram for explaining an overview of color management.

An overview of color management executed by a PC 13 will be described below with reference to FIG. 8.

A color converter 22 receives image data (DevRGB) of RGB values (device RGB values, sRGB values, AdobeRGB values, or the like) from an input device 21. Then, the color converter 22 converts the image data of the input RGB values into those on a profile connection space (PCS) such as XYZ values using a source profile 23.

A color converter 24 converts the image data on the PCS into device RGB values of a monitor 26 using a monitor profile 25 as a destination profile, and outputs image data of the device RGB values to the monitor 26.

When input image data is printed, a color converter 27 converts the image data on the PCS into device RGB values of a printer 29 using a printer profile 28 as a destination profile, and outputs image data of the device RGB values to the printer 29. Then, colors of an image displayed on the monitor 26 can be matched with those of an image printed by the printer 29.

As described above, in order to obtain satisfactory color matching between a display image on the monitor 26 and an image printed by the printer 29, the printer profile 28, which matches the type of a print sheet and illumination light in a viewing environment of a printed matter, has to be used. Hence, the PC 13 adds the color conversion table supplied from the color processing apparatus 11 to the printer profile 28, and controls the color converter 27 to execute color conversion using the added color conversion table. Thus, color matching suited to the illumination light is implemented.

Note that the color conversion table supplied from the color processing apparatus 11 records the estimated illumination characteristics and set estimation conditions. That is, when the PC 13 receives data indicating the estimated illumination characteristics from the color processing apparatus 11, and the printer profile 28 includes a color conversion table which matches the illumination characteristics, it can implement color matching suited to the illumination light using that color conversion table.

[Generation of Illumination Characteristic Database]

Generation of the illumination characteristic database held by the illumination characteristic holding unit 104 is divided into two processes, that is, selection of patches used in estimation, and processing for generating a table (to be referred to as table generation processing hereinafter). The patch selection includes that of a patch used in estimation of a color temperature index and that of patches used in discrimination of a color rendering property type.

Selection of Patch Used in Estimation of Color Temperature Index

In general, since a color temperature and RGB values of the image capturing device exhibit a strong correlation, the color temperature index of illumination light can be estimated from a single-color patch image such as a white patch. On the other hand, it is difficult to discriminate a color rendering property type from a single-color patch image.

FIG. 9 shows correlations between the color temperatures of illumination light and RGB values of a patch image obtained by capturing a white patch. As described above, since the chromaticities $r=R/(R+G+B)$ and $g=G/(R+G+B)$, a ratio with the RGB values of the patch image largely changes when the color temperature of the illumination light changes, as can be seen from FIG. 9. That is, as long as the color temperature of the illumination light and RGB values of a patch image have a strong correlation, a patch of any color may be used in estimation of the color temperature of the illumination light. Of course, patches of two or more colors may be used in place of a single color.

Selection of Patches Used in Discrimination of Color Rendering Property Type

As described above, the user prints the estimation chart using the available printer and print sheet, and spectral reflectance data indicating spectral reflectances of respective patches included in the estimation chart are stored in the memory 106. Also, filter characteristics data of the image capturing device such as a digital camera available for the user, and spectral distribution data indicating spectral distribution characteristics of various types of illumination light are stored in the memory 106.

Figure 10B:
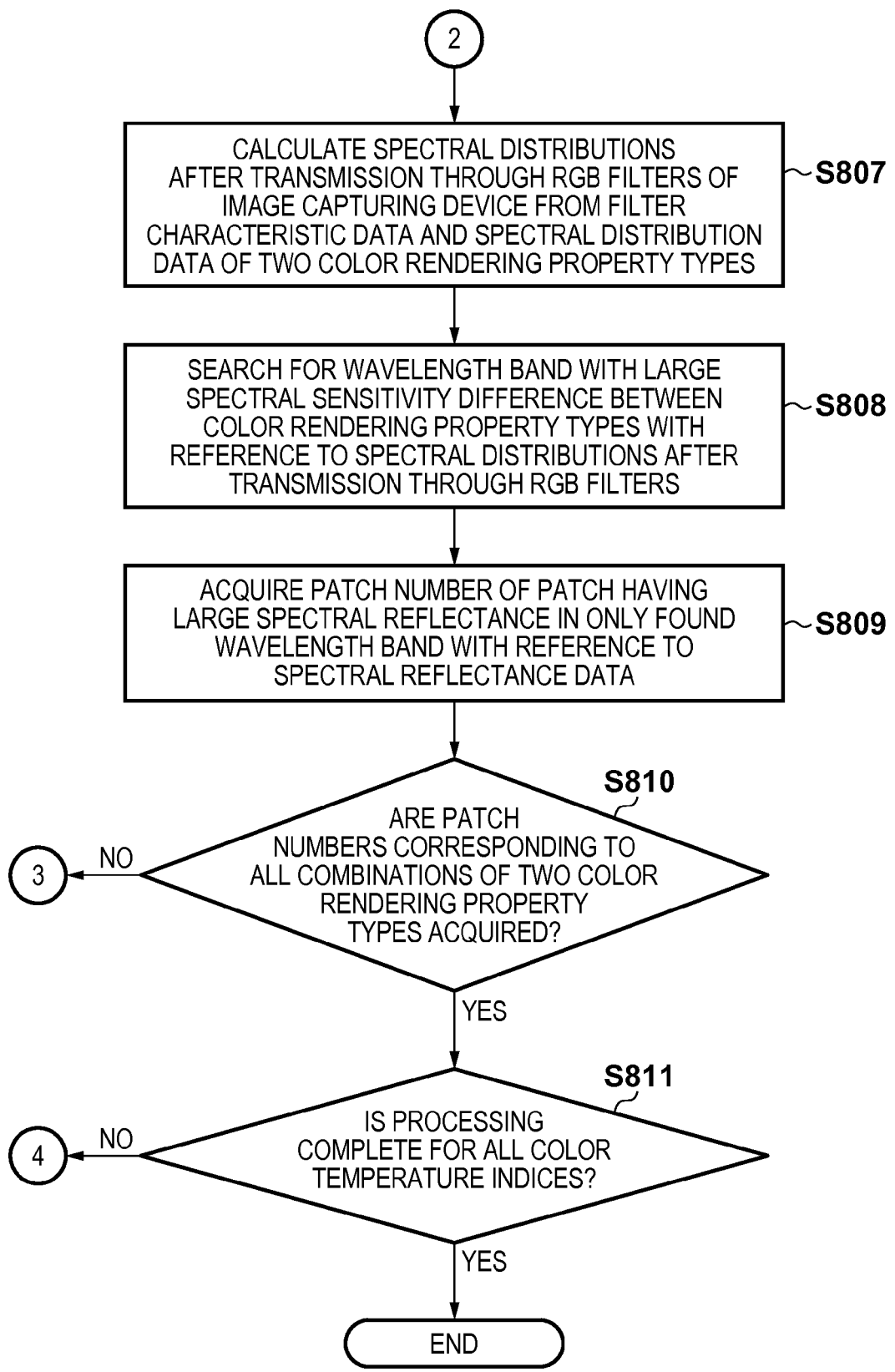

Selection processing of patches used in discrimination of a color rendering property type will be described below with reference to the flowcharts shown in FIGS. 10A and 10B.

When the user presses a database generation button 312, the computing unit 107 receives respective pieces of specifying information of the image capturing device, printer, and print sheet type set in the drop-down combo boxes 303 to 305 (S801).

Next, the computing unit 107 acquires filter characteristic data corresponding to the specifying information of the image capturing device from the memory 106 (S802). Also, the computing unit 107 acquires spectral reflectance data of the estimation chart corresponding to a combination of the pieces of specifying information of the printer and print sheet type from the memory 106 (S803). Furthermore, the computing unit 107 selects one color temperature index (S804), and acquires spectral distribution data corresponding to the selected color temperature index from the memory 106 (S805).

Figure 13:
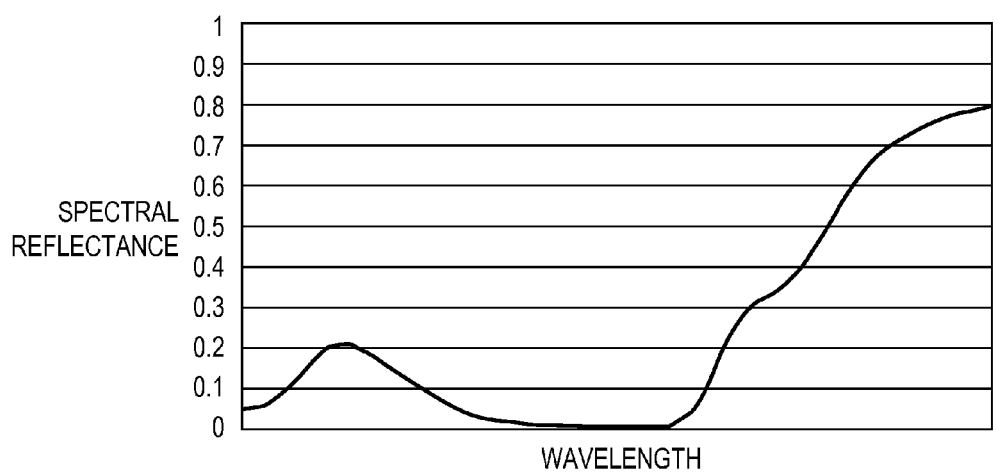
FIG. 13 is a graph showing an example of spectral reflectance data of a certain patch.

FIG. 11 shows an example of the filter characteristic data, FIG. 12 shows an example of the spectral distribution data, and FIG. 13 shows an example of the spectral reflectance data of a certain patch (R=192, G=0, and B=255). The filter characteristic data (FIG. 11) describes spectral sensitivities of respective RGB color filters of the image capturing device at wavelengths obtained by dividing a range of a visible wavelength band (380 to 780 nm) in increments of, for example, 10 nm. Also, the spectral distribution data (FIG. 12) describes, for respective color rendering property types, light intensities at respective wavelengths obtained by dividing a range of a visible wavelength band of illumination light corresponding to a certain color temperature index in increments of, for example, 10 nm. The spectral reflectance data (FIG. 13) describes spectral reflectances of patches at respective wavelengths obtained by dividing a range of a visible wavelength band in increments of, for example, 10 nm.

The computing unit selects two color rendering property types (S806), and calculates spectral distributions after transmission through the RGB filters of the image capturing device by multiplying the filter characteristic data and the spectral distribution data of the two selected color rendering property types (S807) using:

$$R1' = \int_{380}^{780} S1(\lambda) r(\lambda) d\lambda$$

$$G1' = \int_{380}^{780} S1(\lambda) g(\lambda) d\lambda$$

$$B1' = \int_{380}^{780} S1(\lambda) b(\lambda) d\lambda$$

$$R2' = \int_{380}^{780} S2(\lambda) r(\lambda) d\lambda$$

$$G2' = \int_{380}^{780} S2(\lambda) g(\lambda) d\lambda$$

$$B2' = \int_{380}^{780} S2(\lambda) b(\lambda) d\lambda \quad (2)$$

where
S1($\lambda$) is a spectral distribution of the color rendering property type A,
S2($\lambda$) is a spectral distribution of the color rendering property type B,
r($\lambda$) is a spectral sensitivity of an R filter,
g($\lambda$) is a spectral sensitivity of a G filter, and
b($\lambda$) is a spectral sensitivity of a B filter.

Figure 14A:
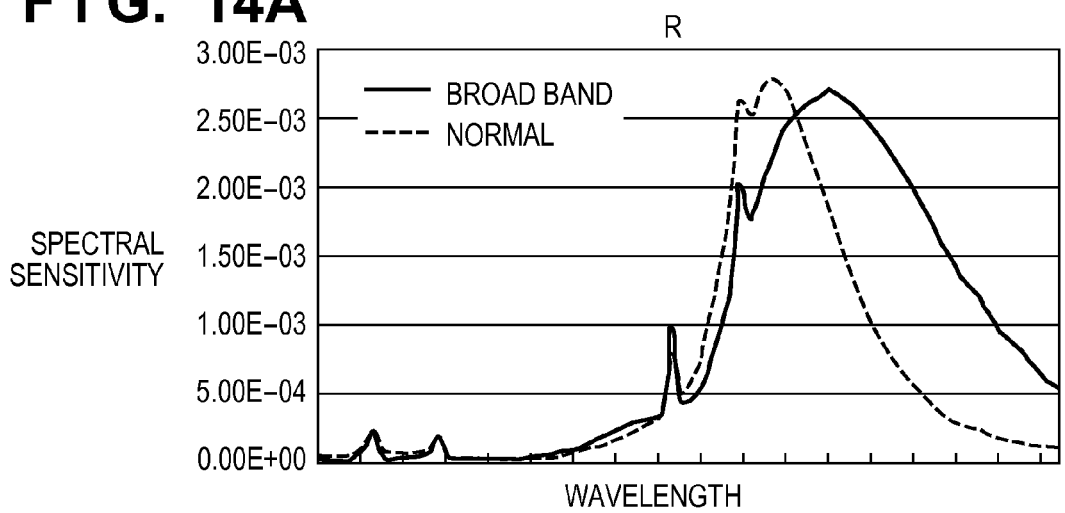
FIGS. 14A to 14C are graphs showing examples of spectral distributions after transmission through RGB filters.
Figure 14B:
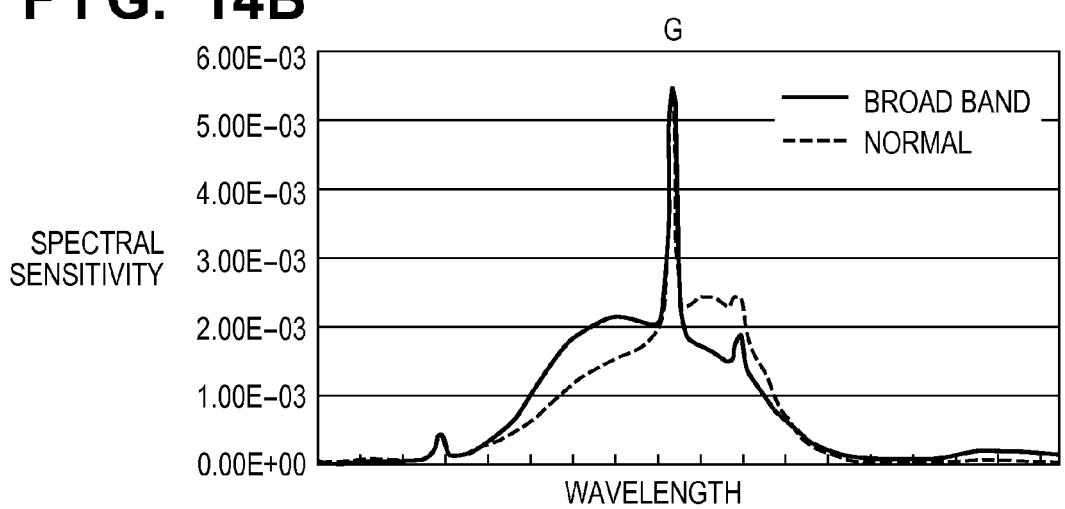
Figure 14C:
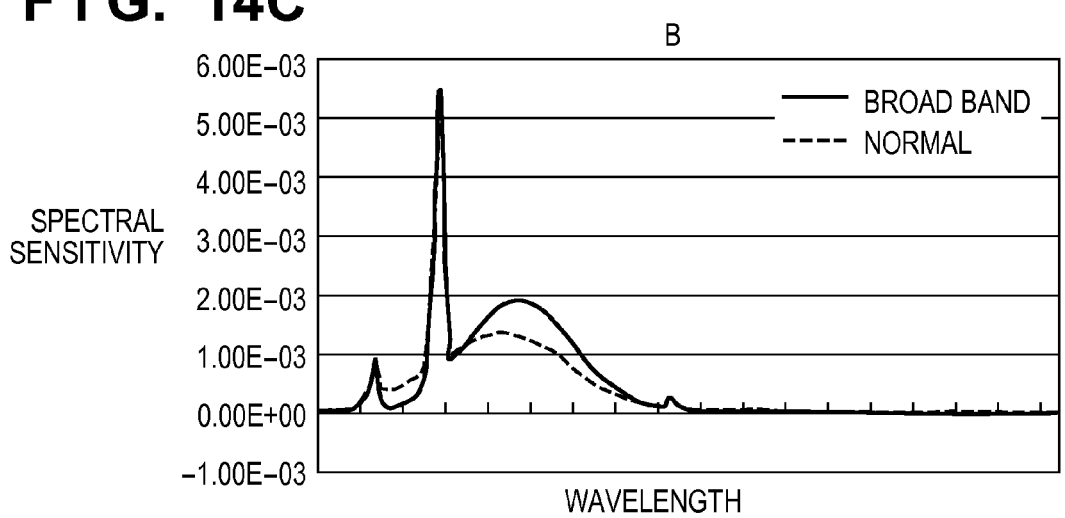

FIGS. 14A to 14C show an example of the spectral distributions after transmission through the RGB filters. Note that FIGS. 14A to 14C exemplify a case in which "neutral white" is selected as a color temperature index, and "broad band" and "normal" are selected as color rendering property types. FIG. 14A shows the spectral distribution after transmission through the R filter, FIG. 14B shows the spectral distribution after transmission through the G filter, and FIG. 14C shows the spectral distribution after transmission through the B filter.

The computing unit 107 refers to the spectral distributions after transmission through the RGB filters to search for a wavelength band having a large difference between the spectral sensitivities R1' and R2' between the color rendering property types (S808). For example, in the combination of "broad band type" and "normal type" corresponding to "neutral white" shown in FIGS. 14A to 14C, a difference is large in a wavelength band from 620 nm to about 700 nm. The computing unit 107 selects a patch which has a large spectral reflectance in only the found wavelength band with reference to the spectral reflectance data, and acquires a patch number of that patch (S809).

Next, the computing unit 107 determines whether or not acquisition of patch numbers of patches corresponding to all combinations of two color rendering property types is complete (S810). If the acquisition is not complete yet, the computing unit 107 repeats the same processes as those in steps S805 to S808 to acquire patch numbers corresponding to all the combinations of the two color rendering property types.

After the patch numbers corresponding to all the combinations of the two color rendering property types for one color temperature index are acquired, the computing unit 107 determines whether or not the aforementioned processes are complete for all color temperature indices (S811). Then, the computing unit 107 repeats the processes in steps S804 to S809 until the processes are complete for all the color temperature indices.

Generation of Illumination Characteristic Database

Figure 15A:
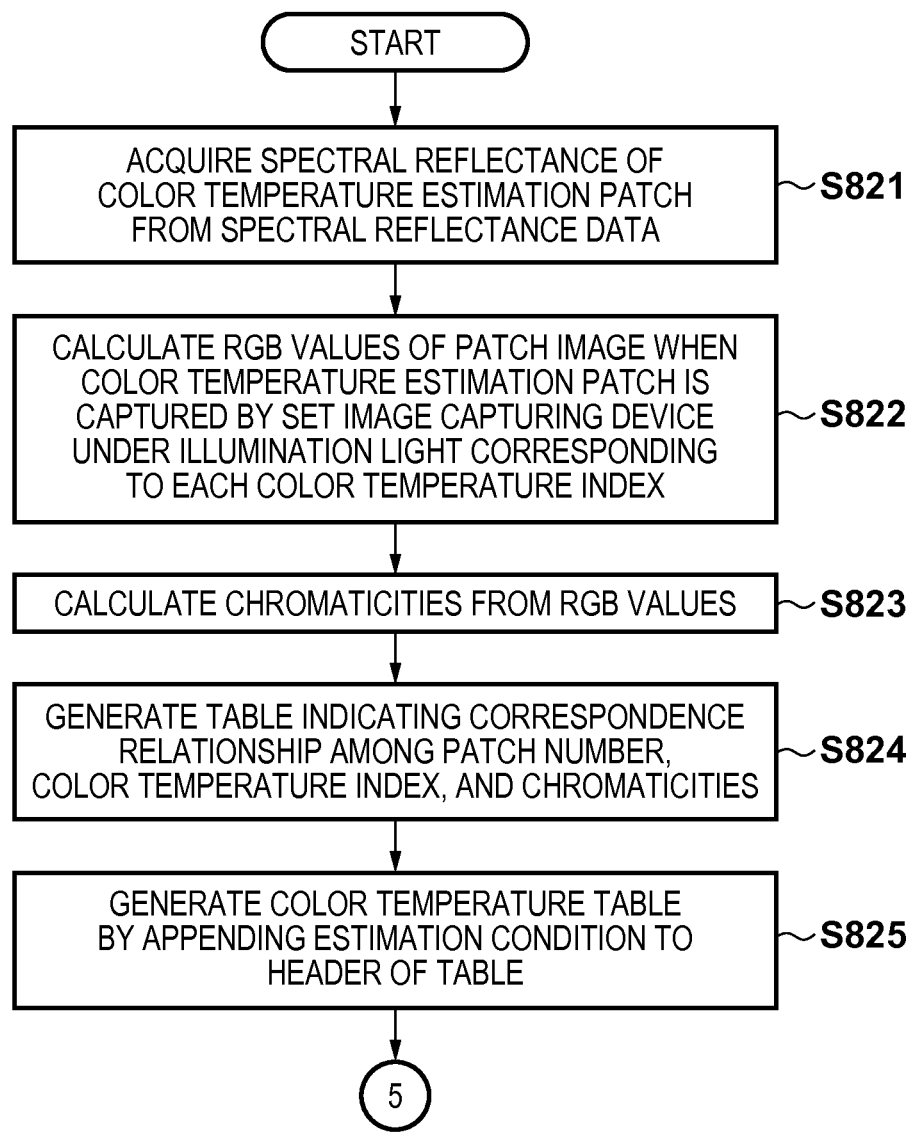
FIGS. 15A and 15B are flowcharts for explaining generation processing of an illumination characteristic database.
Figure 15B:
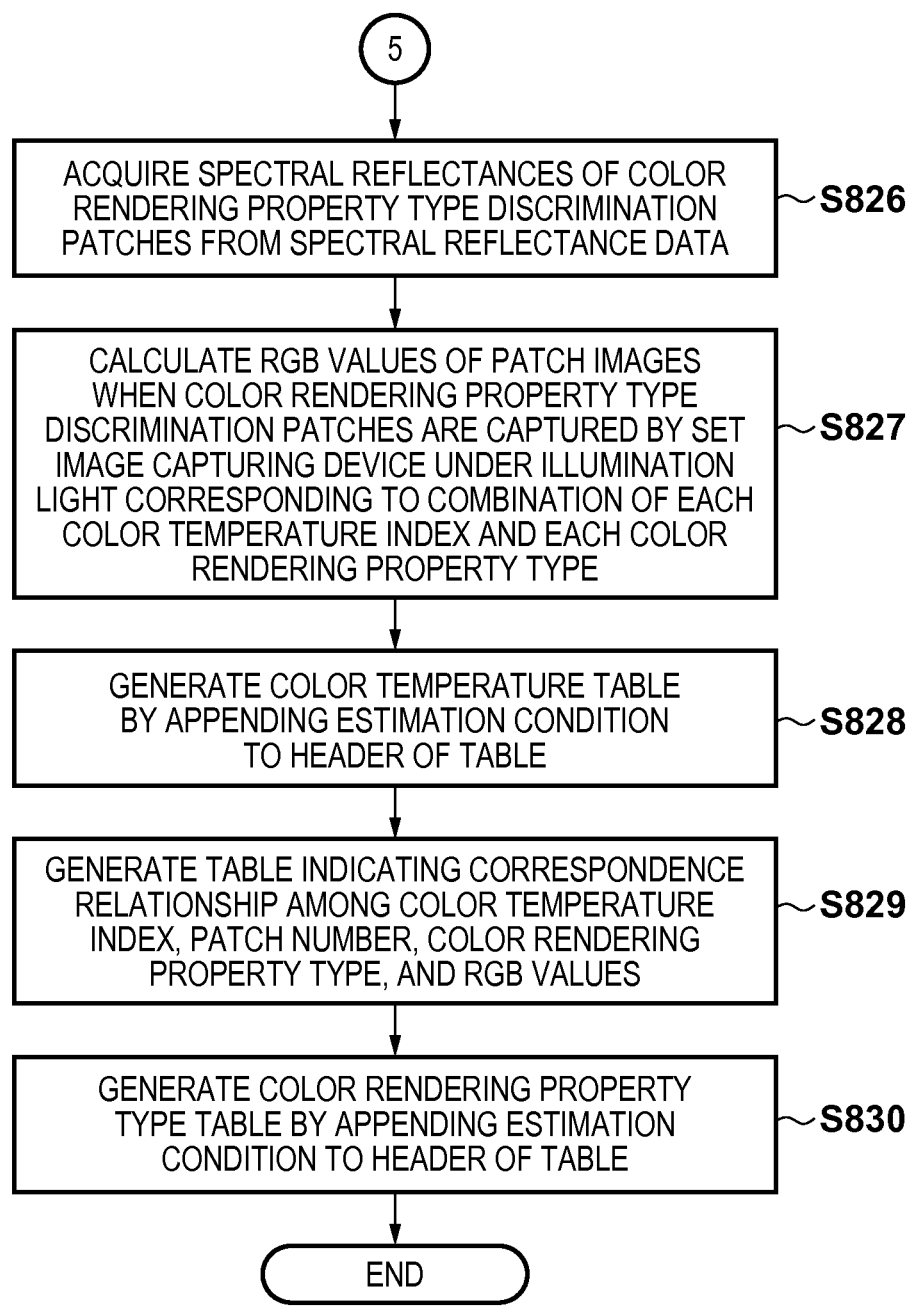

The generation processing of the illumination characteristic database will be described below with reference to the flowcharts shown in FIGS. 15A and 15B. Note that the processing shown in FIGS. 15A and 15B is executed to be continuous to that shown in FIGS. 10A and 10B.

The computing unit 107 acquires a spectral reflectance of a color temperature estimation patch (for example, a white patch) from the spectral reflectance data acquired in step S803 (S821). Then, the computing unit 107 calculates RGB values of a patch image obtained when the color temperature estimation patch is captured by the set image capturing device under respective types of illumination light corresponding to respective color temperature indices (S822) by:

$$R = \int_{380}^{780} S(\lambda) R(\lambda) r(\lambda) d\lambda$$

$$G = \int_{380}^{780} S(\lambda) R(\lambda) g(\lambda) d\lambda$$

$$B = \int_{380}^{780} S(\lambda) R(\lambda) b(\lambda) d\lambda \quad (3)$$

where
S($\lambda$) is a spectral distribution of illumination light,
R($\lambda$) is a spectral reflectance of a patch,
r($\lambda$) is a spectral sensitivity of an R filter,
g($\lambda$) is a spectral sensitivity of a G filter, and
b($\lambda$) is a spectral sensitivity of a B filter.

Note that since RGB value differences depending on color rendering property types are small, RGB values for the color temperature estimation patch are calculated using spectral distribution data corresponding to respective color temperature indices of, for example, the "broad band" type.

Next, the computing unit 107 calculates chromaticities r and g from the calculated RGB values (S823), and generates a table (FIG. 5) indicating the correspondence relationship among the patch number, the color temperature indices, and the calculated chromaticities r and g (S824). The computing unit 107 stores a color temperature table obtained by appending the estimation conditions to a header of the generated table in the illumination characteristic holding unit 104 (S825).

The computing unit 107 then acquires spectral reflectances of color rendering property type discrimination patches from the spectral reflectance data (S826). Then, the computing unit 107 calculates RGB values of patch images obtained when the color rendering property type discrimination patches are captured by the set image capturing device under respective types of illumination light corresponding to combinations of respective color temperature indices and respective color rendering property types using equations (3) (S827).

The computing unit 107 generates a table (FIG. 6) indicating the correspondence relationship among the color temperature indices, patch numbers, color rendering property types A and B, and calculated RGB values (S828). Then, the computing unit 107 stores a color rendering property type table obtained by appending the estimation conditions to a header of the generated table in the illumination characteristic holding unit 104 (S829).

In this manner, from image data obtained by capturing, using the image capturing device, the estimation chart laid out under illumination light, the illumination characteristics of which are to be estimated, the illumination characteristics of the illumination light are estimated, and the color conversion table corresponding to the estimated illumination characteristics can be generated if necessary. Therefore, the user can easily and accurately acquire the illumination characteristics of the illumination light and the color conversion table corresponding to the illumination characteristics in a viewing environment of a printed matter.

Second Embodiment

Color processing according to the second embodiment of the present invention will be described below. Note that the same reference numerals in the second embodiment denote the same components as in the first embodiment, and a detailed description thereof will not be repeated.

The first embodiment has exemplified the case in which the color processing apparatus 11 to which the image capturing device 12 is connected estimates the illumination characteristics. The second embodiment will exemplify a case in which an illumination characteristic database according to a model of the image capturing device 12 is stored in a memory (for example, a ROM) of the image capturing device 12, and an illumination characteristic estimation function is added to the image capturing device 12.

[Arrangement of Device]

Figure 16:
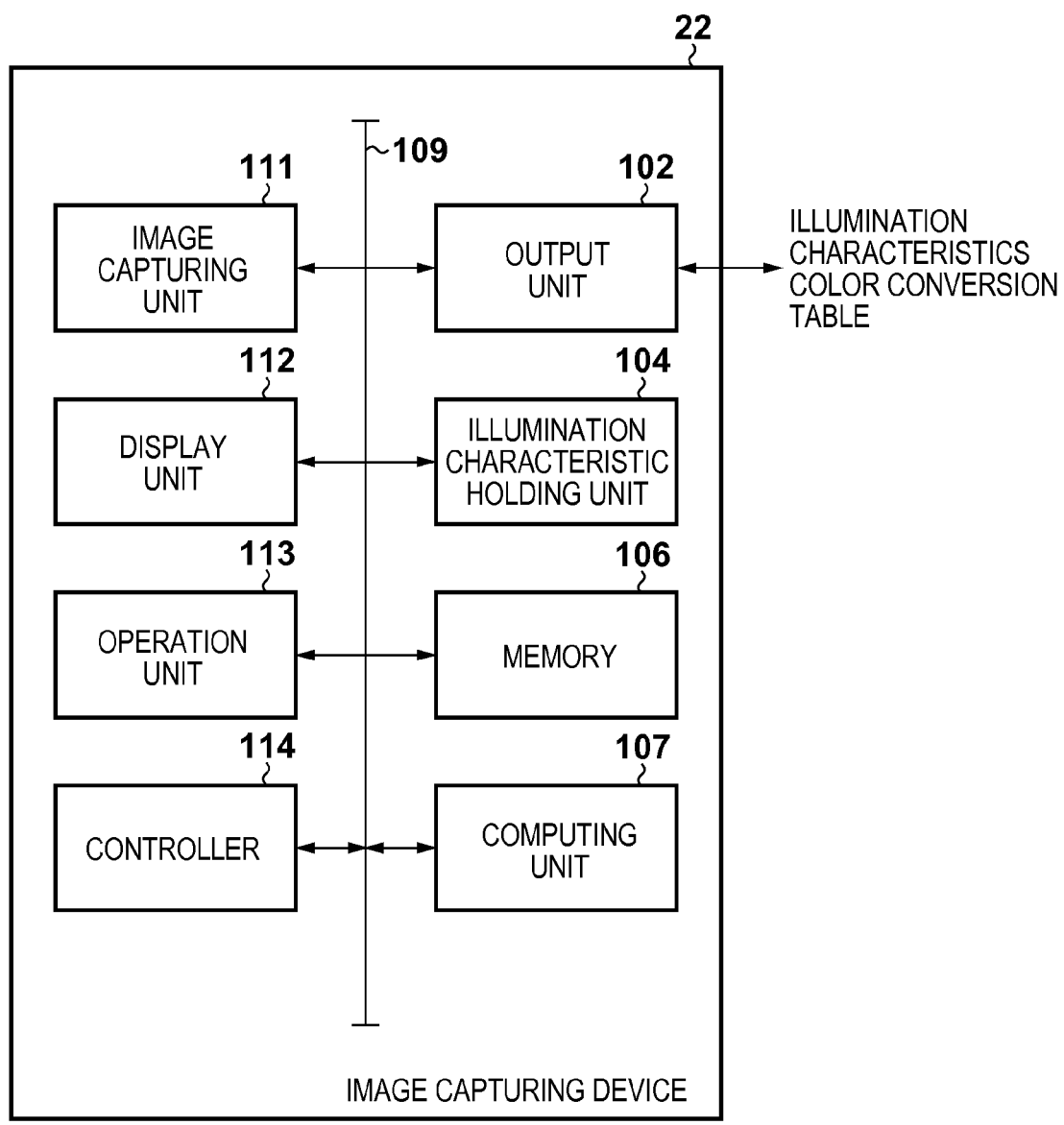
FIG. 16 is a block diagram for explaining the arrangement of an image capturing device according to the second embodiment.

The arrangement of an image capturing device 12 according to the second embodiment will be described below with reference to the block diagram shown in FIG. 16.

The image capturing device 12 is, for example, a digital camera. The image capturing device 12 captures an image associated with illumination light, estimates illumination characteristics, and generates a color conversion table based on the estimated illumination characteristics.

An image capturing unit 111 has a lens, an imaging device, and an image processing circuit, and generates image data of an object. A display unit 112 is, for example, a liquid crystal monitor, and displays an image caught by the image capturing unit 111, an image captured by the image capturing unit 111, various menus, and the like. An operation unit 113 includes buttons, dials, switches, and the like. The user operates the operation unit 113 to capture an image using the image capturing unit 111, to operate a menu displayed on the display unit 112, and to make various settings of the image capturing device 12.

A controller 114 controls the display unit 112 to display a UI and images, receives user instructions via the operation unit 113, and controls the image capturing unit 111 to execute an image capturing operation and the like. An output unit 102, illumination characteristic holding unit 104, memory 106, and computing unit 107 are the same as those in the first embodiment. These units are connected to each other via a system bus 109.

Figure 17:
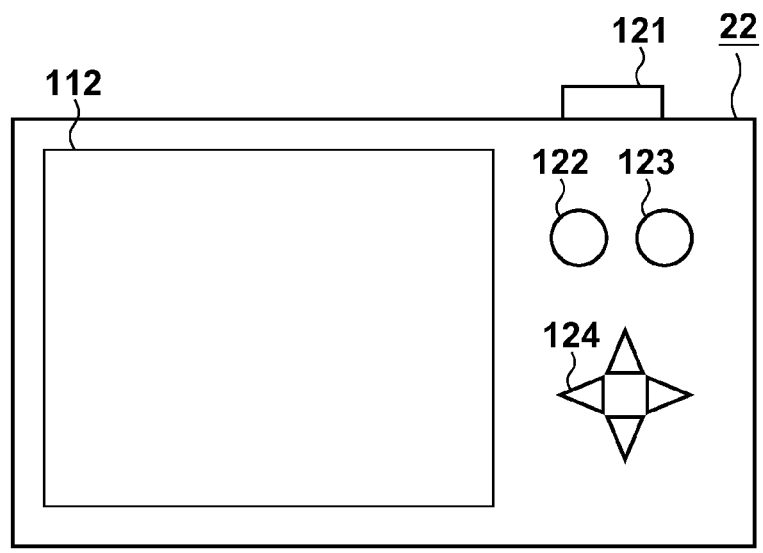
FIG. 17 is a view showing a layout example of a display unit and operation unit.

FIG. 17 shows a layout example of the display unit 112 and operation unit 113. Assuming that a lens layout surface is a front surface, the display unit 112 and some members of the operation unit 113 are laid out on the back surface of the image capturing device 12. The user inputs an image capturing instruction by pressing a release button 121. Also, the user switches an operation mode of the image capturing device 12 by operating a mode switching/cancel key 122, and makes various settings by selecting a menu item displayed on the display unit 112 according to the operation mode using selection keys 124, and then pressing an enter key 123. Alternatively, the display unit 112 and operation unit 113 may include a touch panel function.

[Estimation of Illumination Characteristics and Generation of Color Conversion Table]

Figure 18:
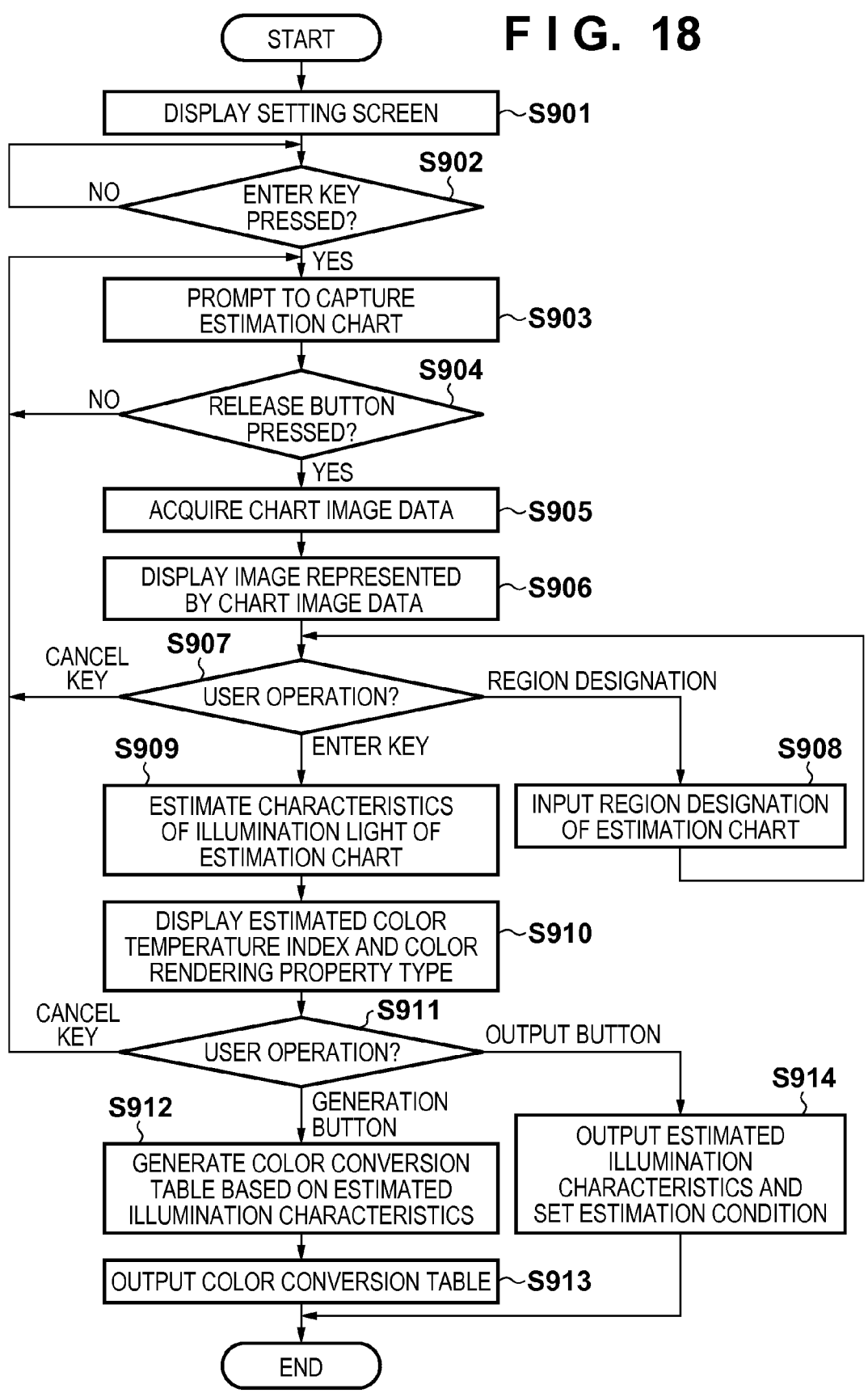
FIG. 18 is a flowchart for explaining estimation processing of illumination characteristics and generation processing of a color conversion table.

The illumination characteristic estimation processing and color conversion table generation processing will be described below with reference to the flowchart shown in FIG. 18. Note that the processing shown in FIG. 18 is started when the user switches the operation mode of the image capturing device 12 to an illumination characteristic estimation mode by operating the operation unit 113.

Figure 19A:
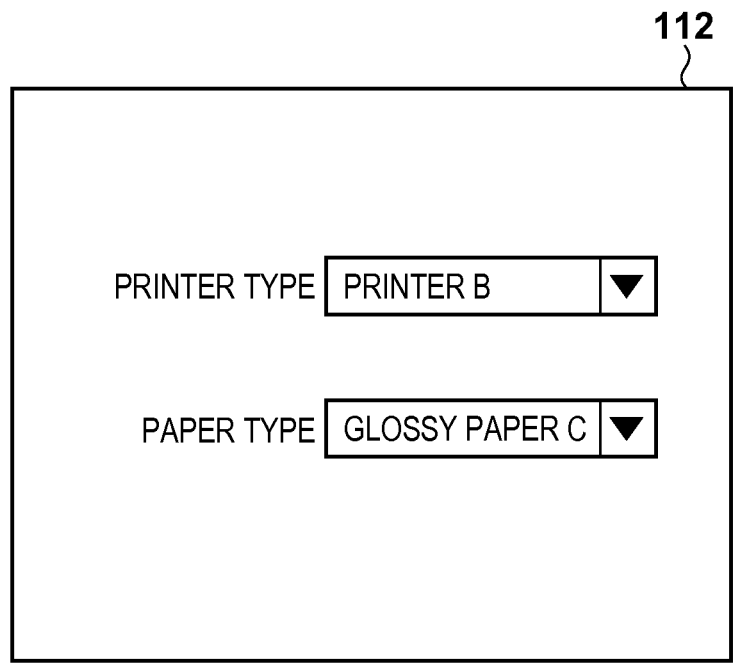
FIGS. 19A and 19B are views showing examples of setting screens.
Figure 19B:
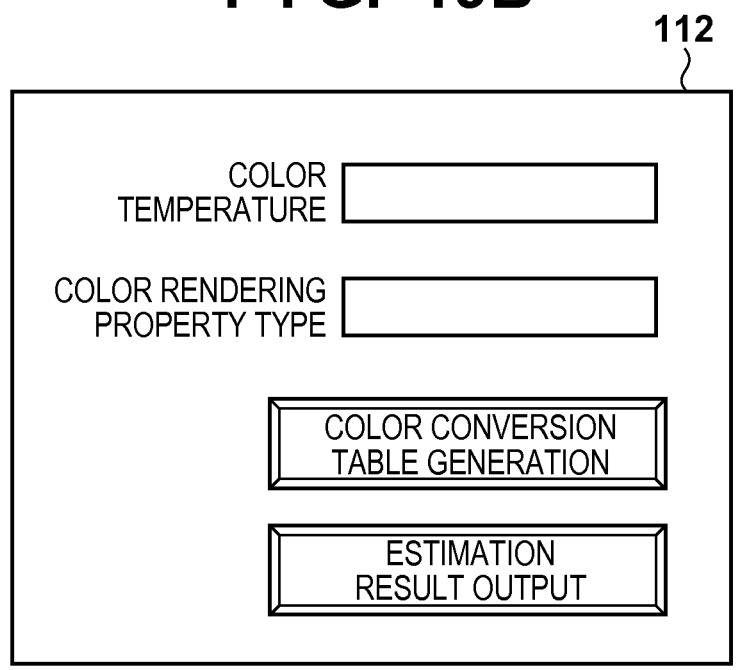

The computing unit 107 displays a setting screen on the display unit 112 (S901). FIGS. 19A and 19B show examples of setting screens. The setting screen shown in FIG. 19A includes a drop-down combo box used to set specifying information of a printer and that used to set specifying information of a print sheet type. The user sets specifying information of a printer used to print an estimation chart, and that of a print sheet type using the setting screen, and then presses, for example, the enter key 123.

After the enter key 123 is pressed (S902), the computing unit 107 displays, for example, a message "capture image of estimation chart" on the display unit 112 to prompt the user to capture an image of the estimation chart (S903). The user places the estimation chart under illumination light, the illumination characteristics of which are to be estimated, and presses the release button 121.

After the release button is pressed (S904), the controller 114 and image capturing unit 111 execute an image capturing operation, and chart image data is stored in the memory 106 (S905). Cautions about the image capturing operation of the estimation chart are the same as those in the first embodiment.

Next, the computing unit 107 displays an image indicated by the chart image data on the display unit 112 (S906). The user refers to the image displayed on the display unit 112 and if the same problems described in the first embodiment are found, he or she presses a cancel key 122 to cancel the current chart image data. If no problem is found, the user designates a region of the estimation chart in the image by, for example, touching four corners of the estimation chart in the display image, and then presses the enter key 123.

If the user cancels the current chart image data (S907), the process returns to step S903. If the user touches a region displayed on the display unit 112 (S907), the computing unit 107 receives the touched positions as region designation data of the estimation chart (S908). Then, if the user presses the enter key 123 (S907), the computing unit 107 estimates the characteristics of the illumination light of the estimation chart (S909).

Next, the computing unit 107 displays an estimated color temperature index and color rendering property type on the display unit 112 (S910), as shown in FIG. 19B. After the color temperature index and color rendering property type are displayed, the user normally presses an estimation result output button or color conversion table generation button (S911). However, when the displayed color temperature index and color rendering property type are different from expected ones, the user presses the cancel key 122 (S911) to cancel the estimation result, and to return the process to step S903.

If the user presses the color conversion table generation button (S911), the computing unit 107 generates a color conversion table corresponding to the estimated illumination characteristics, and the printer and print sheet type, which are set by the user (S912). Subsequently, the output unit 102 outputs the generated color conversion table to an output destination designated by the user (or a connected output destination) (S913), thus ending the processing.

If the user presses the estimation result output button (S911), the output unit 102 outputs data indicating the estimated illumination characteristics and set estimation conditions to an output destination designated by the user (or a connected output destination) (S914), thus ending the processing.

Note that the estimated illumination characteristics may be written in a tag of the chart image data, and that chart image data may be output.

Modification of Embodiments

The example in which the estimated illumination characteristics are displayed has been described. However, the display operation of the illumination characteristics may be omitted.

The example in which RGB values of patches to be stored in the color temperature table and color rendering property type table are calculated has been described. However, from chart image data obtained by capturing images of the estimation chart under a plurality of types of illumination light having different color temperatures and color rendering properties, RGB values of patch images corresponding to color temperature estimation patches and color rendering property type discrimination patches may be acquired.

The example in which the white balance mode upon capturing an image of the estimation chart is set to be "sunny daylight outdoors" has been described. However, the present invention is not limited to "sunny daylight outdoors" as long as the white balance mode assumes a fixed value, and other white balance modes may be used. Conversely, a mode which adjusts a white balance in correspondence with illumination light like an "auto white balance" mode cannot be used. Of course, the white balance used when the user captures an image of the estimation chart has to be matched with that of image data required to generate the color temperature table and color rendering property type table.

The example in which the user designates a chart region included in the captured image of the estimation chart has been described. Alternatively, the computing unit 107 may analyze the captured image to detect the chart region.

The example in which a color temperature index corresponding to chromaticities closest to those of a color temperature estimation patch image is to be estimated has been described. Alternatively, an intermediate color temperature may be calculated based on a ratio between distances of the closest chromaticities and those of the second closest chromaticities.

In the above description, the combinations of the three color rendering property types and five color temperature indices have been described. In this case, combinations which are not commercially available as fluorescent lamps, and those which are not used may be deleted from the illumination characteristic database.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-105657, filed May 10, 2011, which is hereby incorporated by reference herein in its entirety.

What is claimed is:
1. A color processing apparatus comprising:
a first memory which stores a table for each image capturing device capturing a chart, wherein the table records a relationship between image data of patches included in the chart, which are acquired by capturing the chart under a plurality of light sources having different characteristics, and the characteristics of the plurality of light sources;
a first input section configured to input, as estimation conditions, specifying information of an image capturing device used to estimate characteristics of illumination light, and a print condition of a chart used to estimate the characteristics of the illumination light;
a second input section configured to input image data of the chart, which is captured by the image capturing device under the illumination light;
an estimation section configured to estimate the characteristics of the illumination light from the table corresponding to the estimation conditions, and the input image data;
a second memory which stores a color conversion matrix corresponding to a combination of specifying information of an image capturing device and characteristics of illumination light, and device values of respective patches included in a chart;
a converter configured to convert image data of a plurality of patches included in the input image data into color values using the color conversion matrix corresponding to a combination of the input specifying information and the estimated characteristics; and a first generator configured to generate a color conversion table indicating a relationship between the color values of the plurality of patches and device values of respective patches included in a chart corresponding to the input print condition.

2. The apparatus according to claim 1, wherein the characteristics of the illumination light include a color temperature index and a color rendering property type.

3. The apparatus according to claim 1, further comprising:
a third memory which stores filter characteristics of an image capturing device, spectral reflectance characteristics of respective patches included in a chart, and spectral distribution characteristics of a plurality of types of illumination light having the different color temperature indices and the different color rendering property types;
a calculator configured to calculate spectral distributions after transmission through RGB filters of the image capturing device based on the filter characteristics and the spectral distribution characteristics;
a detector configured to detect a wavelength band corresponding to a large spectral sensitivity difference of the image capturing device from the plurality of types of illumination light having the different color rendering property types with reference to the calculated spectral distributions;
a determiner configured to determine patches having large spectral reflectances in the detected wavelength band with reference to the spectral reflectance characteristics; and
a second generator configured to generate the color rendering property type table from image data captured by the image capturing device of the determined patches.

4. A color processing apparatus comprising:
a memory which stores a table for each image capturing device capturing a chart, wherein the table which records a relationship between image data of patches included in the chart, which are acquired by capturing the chart under a plurality of light sources having different characteristics, and the characteristics of the plurality of light sources;
a first input section configured to input, as estimation conditions, specifying information of an image capturing device used to estimate characteristics of illumination light, and a print condition of a chart used to estimate the characteristics of the illumination light;
a second input section configured to input image data of the chart, which is captured by the image capturing device under the illumination light;
an estimation section configured to estimate the characteristics of the illumination light from the table corresponding to the estimation conditions and the input image data,
wherein the characteristics of the illumination light comprise a color temperature index and a color rendering property type, wherein the table stored in the memory comprises a color temperature table and a color rendering property type table,
wherein the color temperature table records a relationship between image data of a predetermined patch included in a chart and color temperature indices of a plurality of light sources, and the image data is acquired by capturing the chart under the plurality of light sources having the different color temperature indices, and
wherein the color rendering property type table records a relationship among image data of a plurality of patches included in a chart, color temperature indices of a plurality of light sources, and color rendering property types of the plurality of light sources, and the image data are acquired by capturing the chart under the plurality of light sources having the different color temperature indices and the different color rendering property types.

5. The apparatus according to claim 4, wherein the estimation section estimates the color temperature index as the characteristics of the illumination light by comparing chromaticities of the predetermined patch recorded in the color temperature table and chromaticities of a patch corresponding to the predetermined patch included in the input image data.

6. The apparatus according to claim 5, wherein the estimation section estimates the color rendering property type as the characteristics of the illumination light by comparing RGB values of a plurality of patches, which are recorded in the color rendering property type table and correspond to the estimated color temperature index, and RGB values of patches corresponding to the plurality of patches included in the input image data.

7. A color processing method comprising:
using a processor to perform the steps of:
storing, in a first memory, a table for each image capturing device capturing a chart, wherein the table records a relationship between image data of patches included in the chart, which are acquired by capturing the chart under a plurality of light sources having different characteristics, and the characteristics of the plurality of light sources;
inputting, as estimation conditions, specifying information of an image capturing device used to estimate characteristics of illumination light, and a print condition of a chart used to estimate the characteristics of the illumination light;
inputting image data of the chart, which is captured by the image capturing device under the illumination light;
estimating the characteristics of the illumination light from the table corresponding to the estimation conditions and the input image data;
storing, in a second memory, a color conversion matrix corresponding to a combination of specifying information of an image capturing device and characteristics of illumination light, and device values of respective patches included in a chart;
converting image data of a plurality of patches included in the input image data into color values using the color conversion matrix corresponding to a combination of the input specifying information and the estimated characteristics; and
generating a color conversion table indicating a relationship between the color values of the plurality of patches and device values of respective patches included in a chart corresponding to the input print condition.

8. A non-transitory computer readable medium storing a computer-executable program for causing a computer to perform the color processing method according to claim 7.

9. A color processing method comprising:
using a processor to perform the steps of:
storing, in a memory, a table for each image capturing device capturing a chart, wherein the table records a relationship between image data of patches included in the chart, which are acquired by capturing the chart under a plurality of light sources having different characteristics, and the characteristics of the plurality of light sources;
inputting, as estimation conditions, specifying information of an image capturing device used to estimate characteristics of illumination light, and a print condition of a chart used to estimate the characteristics of the illumination light;

inputting image data of the chart, which is captured by the image capturing device under the illumination light;

estimating the characteristics of the illumination light from the table corresponding to the estimation conditions and the input image data, wherein the characteristics of the illumination light comprise a color temperature index and a color rendering property type, wherein the table stored in the memory comprises a color temperature table and a color rendering property type table, wherein the color temperature table records a relationship between image data of a predetermined patch included in a chart and color temperature indices of a plurality of light sources, and the image data is acquired by capturing the chart under the plurality of light sources having the different color temperature indices, and wherein the color rendering property type table records a relationship among image data of a plurality of patches included in a chart, color temperature indices of a plurality of light sources, and color rendering property types of the plurality of light sources, and the image data are acquired by capturing the chart under the plurality of light sources having the different color temperature indices and the different color rendering property types.

10. A non-transitory computer readable medium storing a computer-executable program for causing a computer to perform the color processing method according to claim 9.

* * * * *